US012521301B2

(12) United States Patent
Kong et al.

(10) Patent No.: US 12,521,301 B2
(45) Date of Patent: Jan. 13, 2026

(54) MASSAGE APPARATUS INCLUDING ARM MASSAGE PART

(71) Applicant: BODYFRIEND CO., LTD., Seoul (KR)

(72) Inventors: Deok Hyun Kong, Seoul (KR); Myeong Jin You, Seoul (KR); Yong Ju Kwon, Seoul (KR)

(73) Assignee: BODYFRIEND CO., LTD., Seoul (KR)

( * ) Notice: Subject to any disclaimer, the term of this patent is extended or adjusted under 35 U.S.C. 154(b) by 644 days.

(21) Appl. No.: 17/927,745

(22) PCT Filed: May 26, 2021

(86) PCT No.: PCT/KR2021/006529
§ 371 (c)(1),
(2) Date: Nov. 25, 2022

(87) PCT Pub. No.: WO2021/241996
PCT Pub. Date: Dec. 2, 2021

(65) Prior Publication Data

US 2023/0201069 A1 Jun. 29, 2023

(30) Foreign Application Priority Data

May 27, 2020 (KR) ........................ 10-2020-0063453

(51) Int. Cl.
*A47C 1/024* (2006.01)
*A47C 1/03* (2006.01)
(Continued)

(52) U.S. Cl.
CPC ......... *A61H 15/0078* (2013.01); *A47C 1/024* (2013.01); *A47C 1/03* (2013.01);
(Continued)

(58) Field of Classification Search
CPC ..... A47C 1/024; A47C 1/03294; A47C 1/028; A47C 1/022; A47C 1/03–0308;
(Continued)

(56) References Cited

U.S. PATENT DOCUMENTS

2014/0159454 A1* 6/2014 Furutani ................ A47C 1/035 297/341
2022/0386776 A1* 12/2022 Paz ........................ A61G 5/006

FOREIGN PATENT DOCUMENTS

DE 29906823 U1 * 8/1999 ............. A47C 7/543
JP 2001-511047 A 8/2001

(Continued)

*Primary Examiner* — Victoria Murphy
*Assistant Examiner* — Sara K Toich
(74) *Attorney, Agent, or Firm* — Bridgeway IP Law Group, PLLC; Sang Ho Lee; Hyun Woo Shin

(57) ABSTRACT

The present disclosure relates to a massage apparatus including an arm massage part, the massage apparatus comprising: a frame connection part which connects a buttock frame provided in a main frame and a back frame provided in the main frame, and which rotates about a frame rotation axis on the basis of the movement of the back frame; a driving shaft which passes through the frame connection part and moves along an arc-shaped driving shaft slot on the basis of the movement of the back frame; and an arm massage frame holder which moves along a sliding rail on the basis of the movement of a plurality of links that transmit the movement of the driving shaft.

12 Claims, 16 Drawing Sheets

(51) Int. Cl.
*A47C 1/031* (2006.01)
*A61H 15/00* (2006.01)

(52) U.S. Cl.
CPC ...... *A47C 1/031* (2013.01); *A61H 2015/0014* (2013.01); *A61H 2015/0042* (2013.01); *A61H 2201/0192* (2013.01); *A61H 2201/1207* (2013.01); *A61H 2201/14* (2013.01); *A61H 2201/1623* (2013.01); *A61H 2201/1633* (2013.01); *A61H 2201/1635* (2013.01); *A61H 2201/164* (2013.01); *A61H 2201/5048* (2013.01); *A61H 2203/0437* (2013.01); *A61H 2205/06* (2013.01); *A61H 2205/10* (2013.01)

(58) Field of Classification Search
CPC ......... A47C 1/029; A47C 1/0265; A47C 7/54; A47C 7/541; A61H 2201/0149; A61H 2201/1633; A61H 2201/0138; A61H 15/00; B60N 2/75; B60N 2/753–777
See application file for complete search history.

(56) References Cited

FOREIGN PATENT DOCUMENTS

| | | | | | |
|---|---|---|---|---|---|
| JP | 2003070859 | A | * | 3/2003 | |
| JP | 2008188055 | A | * | 8/2008 | |
| JP | 2018134183 | A | * | 8/2018 | |
| JP | 2019-022809 | A | | 2/2019 | |
| KR | 10-0739020 | B1 | | 7/2007 | |
| KR | 10-2019-0136807 | A | | 12/2019 | |
| WO | WO-2012043118 | A1 | * | 4/2012 | ......... A47C 1/03294 |

* cited by examiner

MASSAGE APPARATUS INCLUDING ARM MASSAGE PART

TECHNICAL FIELD

The present invention relates to a massage apparatus including an arm massage unit and an operating method thereof.

BACKGROUND ART

Massage is a medical adjuvant therapy for controlling the modulation of the body of a user helping blood circulation, and relieving fatigue of the user by applying various types of mechanical stimulation to a portion of the body, such as massaging, pressing, pulling, tapping, or moving a portion of the body of the user, helping blood circulation.

The growth in a massage demand caused an increase in demand for massage apparatuses or massage devices, which provide an artificial massage function, because of economic feasibility and temporal reasons. That is, as the demand for relieving fatigue or stress is increased while loosening the agglomerated muscles through massage, various mechanical massage apparatuses for time and cost efficiencies are being released. Any type of instruments, devices, or apparatuses for performing massage without a massagist is referred to as a massage apparatus.

Recently, massage devices having a backrest of the massage chair which completely reclines has started appearing. The position of the user's arm will inevitably be different when sitting versus when reclining, and research is actively being performed because of the problem that massaging cannot be effectively provided by the fixed arm massage unit to both the users who are in a sitting position and a reclining position.

DISCLOSURE

Technical Problem

Accordingly, the present invention has been made in view of the above-mentioned problems occurring in the related art, and it is an object of the present invention to provide a massage apparatus including an arm massage unit and an operating method thereof.

Technical Solution

To accomplish the above-mentioned objects, according to the present invention, there is provided a massage apparatus including: a frame connection part for connecting a buttock frame included in a main frame and a back frame included in the main frame and rotating around a frame rotation shaft depending on movement of the back frame; a driving shaft passing through the frame connection part and moving along an arc-shaped driving shaft slot depending on the movement of the back frame; a third link for transmitting the movement of the driving shaft; a second link rotating around a link rotation shaft depending on the movement of the third link; a first link transmitting the movement of the second link to an arm massage unit frame holder; and an arm massage unit frame holder moving along a sliding rail depending on the movement of the first link, wherein the driving shaft is connected to one end of the third link, the other end of the third link is connected to one end of the second link, and the other end of the first link is connected to the arm massage unit frame holder.

The first link, the second link, the third link, the arm massage unit frame holder, the driving shaft slot, the arm massage unit coupling groove, and the sliding rail of the massage apparatus according to an embodiment of the present invention are included in a side cover, and the side cover is separable from the massage apparatus.

The main frame of the massage apparatus according to an embodiment of the present invention is separable from the side cover, and a main frame protrusion included in the main frame is inserted into the arm massage unit coupling groove included in the side cover, and the driving shaft is inserted into the driving shaft slot included in the side cover, and the side cover is coupled to the massage apparatus.

The massage apparatus according to an embodiment of the present invention further includes a driving shaft plunger connecting the driving shaft and the third link, wherein the driving shaft is inserted into a groove of the driving shaft plunger, and the driving shaft plunger is coupled to the third link.

A length ranging from the link rotation shaft to one end of the second link is shorter than a length ranging from the link rotation shaft to the other end of the second link.

The back frame of the massage apparatus according to an embodiment of the present invention is tilted backward, the frame connection part rotates around the frame rotation shaft, the driving shaft passing through the other end of the frame connection part moves forward along the driving shaft slot, the third link connected to the driving shaft moves one end of the second link forward so that the second link rotates around the link rotation shaft, the other end of the second link moves backward by the rotation of the second link, and the first link connected to the other end of the second link moves backward along the sliding rail together with the arm massage unit frame holder.

The side cover of the massage apparatus according to an embodiment of the present invention includes a lower cover and an upper cover, and the lower cover has an inclined surface descending backward and is fixed to the main frame not to move. The sliding rail is disposed along an inclined surface of the lower cover.

The upper cover of the massage apparatus according to an embodiment of the present invention includes an arm massage unit frame, and the arm massage unit frame coupled to the arm massage unit frame holder descends backward based on the sliding rail on the inclined surface.

The frame rotation shaft of the frame connection part of the massage apparatus according to an embodiment of the present invention passes through the buttocks frame from side to side. The frame connection part rotates around the frame rotary shaft so that the buttock frame does not move when the back frame is tilted backward or is erected forward.

The frame rotation shaft of the frame connection part of the massage apparatus according to an embodiment of the present invention penetrates the back of the buttock frame from side to side. The front of the buttock frame moves upward or downward based on the frame rotation shaft in a state in which the frame connection part and the back frame do not move.

The driving shaft slot of the massage apparatus according to an embodiment of the present invention is in an arc shape of which the ground direction is convex.

The driving shaft of the massage apparatus according to an embodiment of the present invention is rotatable along an arc-shaped driving shaft slot around the frame rotation shaft of the frame connection part.

In addition, a program for implementing an operating method of the massage apparatus described above may be recorded in a computer-readable recording medium.

Advantageous Effects

The massage apparatus according to the present invention can move the arm massage unit to an appropriate position even if the backrest of a massage chair is changed from an erected posture to a lying posture so that a relative position of the arm of the user is changed, thereby providing massage to the user without inconvenience.

The effects of the present invention are not limited to the above-mentioned effects, and other effects, which are not specifically mentioned herein, will be clearly understood by those skilled in the art from the following description.

BEST MODE

Figure 1:
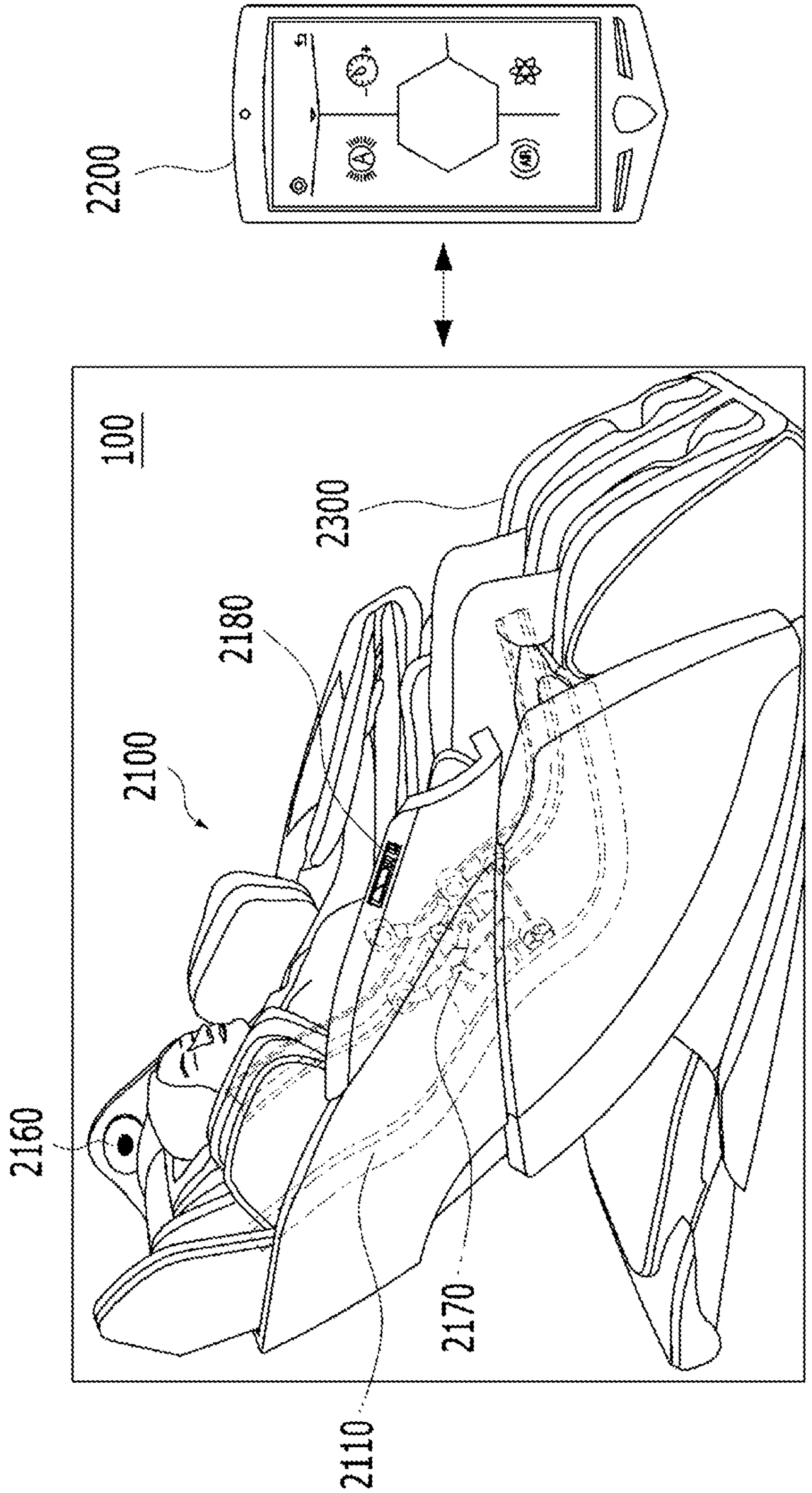
FIG. 1 is a view for depicting a massage apparatus according to an embodiment of the present invention.

A massage apparatus including: a frame connection part for connecting a buttock frame included in a main frame and a back frame included in the main frame and rotating around a frame rotation shaft depending on movement of the back frame; a driving shaft passing through the frame connection part and moving along an arc-shaped driving shaft slot depending on the movement of the back frame; a third link for transmitting the movement of the driving shaft; a second link rotating around a link rotation shaft depending on the movement of the third link; a first link transmitting the movement of the second link to an arm massage unit frame holder; and an arm massage unit frame holder moving along a sliding rail depending on the movement of the first link, wherein the driving shaft is connected to one end of the third link, the other end of the third link is connected to one end of the second link, and the other end of the first link is connected to the arm massage unit frame holder.

Mode for Invention

Advantages and features of the present invention and methods accomplishing the advantages and features will become apparent from the following detailed description of exemplary embodiments with reference to the accompanying drawings. However, the present invention is not limited to exemplary embodiment disclosed herein but will be implemented in various forms. The exemplary embodiments are provided so that the present invention is completely disclosed, and a person of ordinary skilled in the art can fully understand the scope of the present invention.

Terms used herein will be briefly described, and the disclosed embodiments will be described in detail.

The terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

The singular forms of the components may be understood into the plural forms unless otherwise specifically stated in the context. Furthermore, the plural forms may include singular forms unless otherwise specifically stated in the context.

In the entire specification of the present invention, when a certain part "includes" a certain component, other components are not excluded unless explicitly described otherwise, and other components may in fact be included.

The term, "unit", used in the present invention means a software element or a hardware element, and the "unit" performs some roles. However, the term, "unit", is not limited to software or hardware. The "unit" may be configured in an addressable storage medium or may be configured to play one or more processors. Therefore, as an example, a "unit" includes elements, such as software elements, object-oriented software elements, class elements, and task elements, processes, functions, attributes, procedures, subroutines, segments of program codes, drivers, firmware, microcode, circuits, data, databases, data structures, tables, arrays, and variables. Functions provided within the elements and "units" may be combined with a smaller number of elements and "units" or may be further divided into additional elements and "units".

According to an embodiment of the present invention, the "unit" may be implemented as a processor and a memory. The term "processor" should be interpreted broadly to encompass a general-purpose processor, a central processing unit (CPU), a microprocessor, a digital signal processor (DSP), a controller, a microcontroller, a state machine, and the like. In some environments, a "processor" may refer to an application specific integrated circuit (ASIC), a programmable logic device (PLD), a field programmable gate array (FPGA), or the like. The term "processor" may refer to a combination of processing devices, such as a combination of a DSP genome and a microprocessor, a combination of a plurality of microprocessors, a combination of one or more microprocessors in combination with a DSP couple core, or a combination of any other such configurations.

The term "memory" should be interpreted broadly to include any electronic component capable of storing electronic information. The term memory may refer to various types of processor-readable media such as random access memory (RAM), read-only memory (ROM), non-volatile random access memory (NVRAM), programmable read-only memory (PROM), erase-programmable read-only memory (EPROM ACL), electrically erasable PROM (EEPROM), flash memory, magnetic or optical data storage, registers, and the like. Memory is referred to as being in electronic communication with the processor if the processor can read information from, and/or write information to, the memory. The memory integrated in the processor is in electronic communication with the processor.

In the present specification, an actuator refers to a configuration capable of providing a driving force. For example, the actuator may include a motor, a linear motor, an electronic motor, a DC motor, an AC motor, a linear actuator, an electric actuator, and the like, but is not limited thereto.

In the present specification, according to an embodiment, a massage apparatus may refer to a massage apparatus including a body massage unit and a leg massage unit. In addition, according to another embodiment, a body massage unit 2100 and a leg massage unit 2300 may be provided as separate devices (for example, a body massage apparatus and a leg massage apparatus), and the massage apparatus may refer to a body massage apparatus or a leg massage apparatus.

Hereinafter, embodiments of the present invention will be described in detail with reference to the accompanying drawings so as to be easily carried out by a person skilled in the art to which the present invention pertains. In addition, in order to clearly describe the present invention, portions irrelevant to the description will be omitted.

FIG. 1 is a view for depicting a massage apparatus according to an embodiment of the present invention.

The massage apparatus 100 according to an embodiment of the present invention may include a body massage unit 2100 for forming an area for accommodating at least a portion of the body of a user and massaging the body of the user, and a leg massage unit 2300 for massaging the user's legs.

The body massage unit 2100 may provide massage to at least a portion of the body of the user. The body massage unit 2100 may include a massage module 2170 for providing a massage function to at least a portion of the body of the user, an audio output module 2160 for providing an audio output of an arbitrary form to the user, a main frame 2110 constituting a framework of the body massage unit 2100, and a user input unit 2180 for receiving any form of input from the user.

The components included in the body massage unit 2100 described above are merely exemplary embodiments, and the body massage unit 2100 may include various configurations besides the above described configuration.

In addition, the shape and structure of the massage apparatus 100 illustrated in FIG. 1 are merely exemplary, and various types of massage apparatuses 100 may also be included within the scope of the present invention unless departing from the scope of the present invention defined by the claims of the present invention.

The body massage unit 2100 may form a space for accommodating the user. The body massage unit 2100 may have a space corresponding to the shape of the body of the user. For example, as illustrated in FIG. 1, the body massage unit 2100 may be implemented as a seating type capable of accommodating the whole body or a portion of the body of the user.

A portion of the body massage unit 2100, which gets in contact with the ground, may include any material or any member (for example, an anti-slip pad or the like) for increasing a frictional force, and may include a wheel for enhancing mobility of the massage apparatus 100.

At least a portion of the body massage unit 2100 may slide. For example, in a case in which the body massage unit 2100 starts massage, at least a portion of the body massage unit 2100 may slide forward. In addition, the body massage unit 2100 may be tilted backward. As a result, the body massage unit 2100 may provide massage while being tilted backward.

According to an embodiment of the present invention, the massage apparatus 100 may include at least one air cell (not illustrated). The air cell may be located at a shoulder portion, a pelvis portion, arm massage units, a leg massage unit 2300, and the like, but is not limited thereto, and may be disposed in various portions of the massage apparatus 100.

The massage apparatus 100 may include an air supply unit, and the air supply unit may inflate the air cell by supplying air to the air cell. The air supply unit may be located inside the body massage unit 2100 and may be located in the leg massage unit 2300. Additionally, the air supply unit may be located outside the massage apparatus 100.

The leg massage unit 2300 may massage the user's legs. For example, the leg massage unit 2300 may include a calf massage unit for massaging the calves of the user and/or a foot massage unit for massaging the user's feet.

The leg massage unit 2300 may adjust the length according to the body characteristics of the user. For example, in a case in which a user who is tall uses the massage apparatus 100, it is necessary to lengthen the leg massage unit 2300 since the user has long calves. Moreover, in a case in which a user who is short uses the massage apparatus 100, it is necessary to shorten the leg massage unit 2300 since the user has short calves.

The massage module 2170 may be provided inside the body massage unit 2100 to provide a mechanical stimulation to the user accommodated in the body massage unit 2100. As illustrated in FIG. 1, the massage module 2170 may move along a main frame 2110 provided inside the body massage unit 2100.

For example, a rack gear may be provided in the main frame 2110 of the body massage unit 2100. The massage module 2170 may provide dynamic stimulation to various parts of the body of the user while moving along the rack gear. The massage module 2170 may include a ball massage unit or a roller massage unit, but is not limited thereto.

The main frame 2110 constitutes a frame of an internal configuration of the body massage unit 2100, and may be formed of a metal material, a plastic material, or the like. For example, the main frame 2110 may be made of iron, an alloy, steel, or the like, but is not limited thereto, and may be made with various rigid materials.

According to an embodiment of the present invention, the massage apparatus 100 may include an audio output module 2160. The audio output module 2160 may be provided at various positions. For example, the audio output module 2160 may include a plurality of output units, such as an upper audio output unit disposed on an upper end of a seat portion getting in contact with the user, a front audio output unit attached to a front end of the left and right arm massage units of the seat portion, and/or a rear audio output units attached to rear ends of the arm massage units, but is not limited thereto. In this case, the audio output module 2160 may provide a stereoscopic sound, such as a 5.1 channel, but is not limited thereto.

According to an embodiment of the disclosure, the user may control the massage apparatus 100 by using a massage apparatus control device 2200. The massage apparatus control device 2200 may be connected to the massage apparatus 100 through wired communication and/or wireless communication.

The massage apparatus control device 2200 may include a remote controller, a cellular phone, a personal digital assistant (PDA), and the like, but is not limited thereto, and may include various electronic devices connectable to the massage apparatus 100 through wired or wireless communication.

Figure 2:
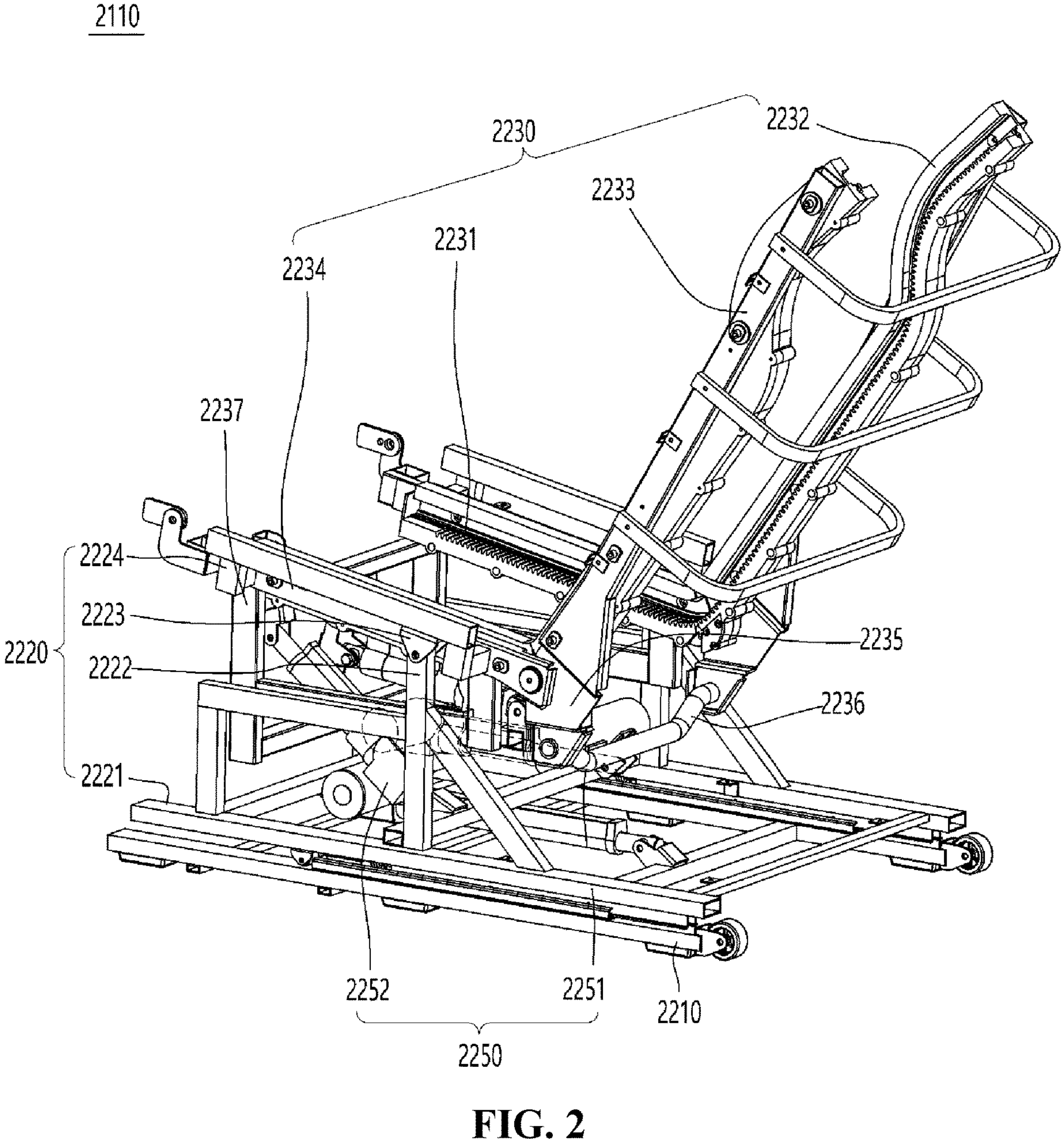
FIG. 2 is a view for depicting a main frame according to an embodiment of the present invention.
Figure 3:
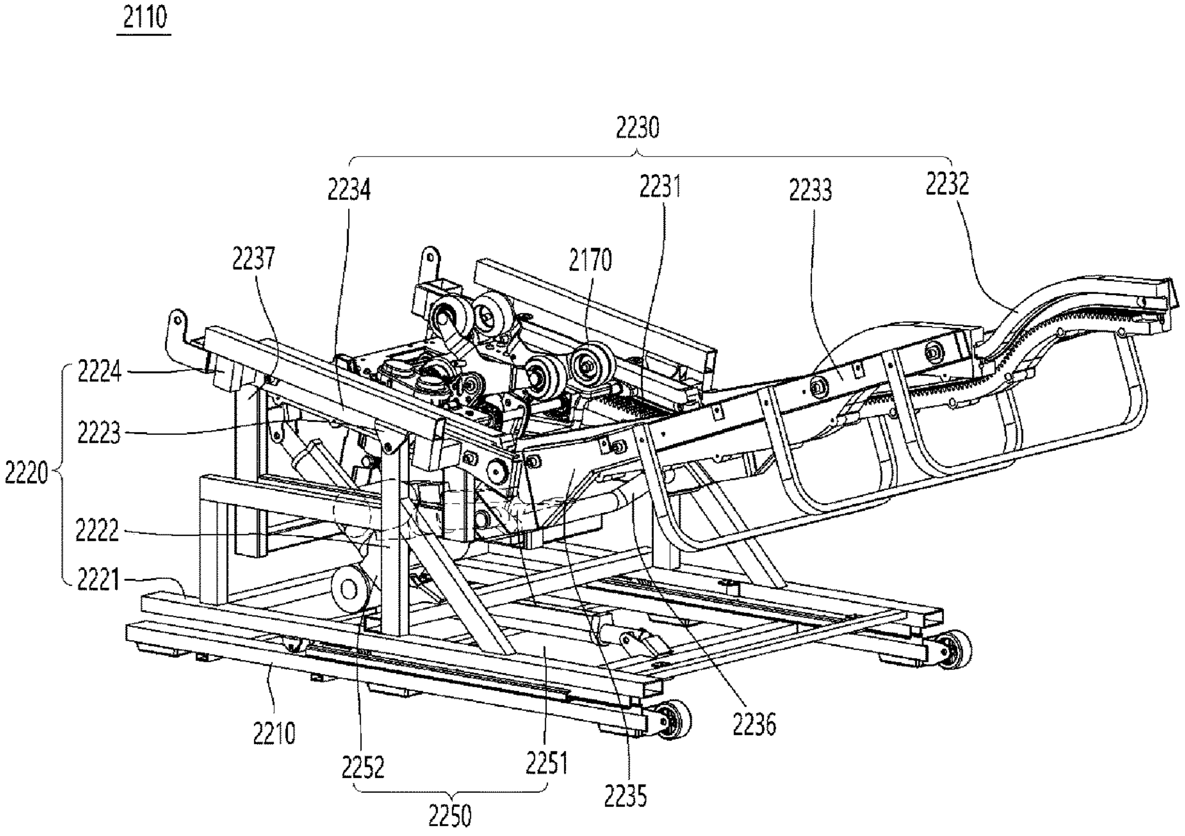
FIG. 3 is a view for depicting a main frame according to an embodiment of the present invention.

FIGS. 2 and 3 are views for depicting a main frame according to an embodiment of the present invention. Specifically, FIG. 3 is a view illustrating a state in which an angle of the back frame 2232 is changed.

According to an embodiment of the disclosure, the main frame 2110 may include at least one among a base frame 2210, a lower frame 2220, and an upper frame 2230. In addition, a frame actuator 2250 and the massage module 2170 may be disposed in the main frame 2110 according to an embodiment of the present invention.

The base frame 2210 may be disposed on the ground to stably support the massage apparatus 100. The base frame 2210 may be supported by the ground and may support the lower frame 2220 and the upper frame 2230. The base frame 2210 according to an embodiment may be relatively widely disposed to balance the center of gravity of the massage apparatus 100, but is not limited thereto.

The lower frame 2220 may support the upper frame 2230. The lower frame 2220 according to an embodiment may directly support the buttock frame 2231 of the upper frame 2230. The lower frame 2220 according to an embodiment may be disposed perpendicular to one side and the other side of the base frame 2210 to support the upper frame 2230, but is not limited thereto.

According to an embodiment of the present invention, the lower frame 2220 may move along the base frame 2210. For example, the lower frame 2220 may slide forward or backward along the base frame 2210. Accordingly, the sliding movement of the body massage unit 2100 may be allowed.

Specifically, in order to allow movement of the lower frame 2220, a moving wheel may be provided beneath the lower frame 2220. In addition, a guide member capable of guiding the moving wheel may be provided on an upper portion of the base frame 2210. The moving wheel provided beneath the lower frame 2220 may move along the guide member provided on the base frame 2210, thereby allowing forward movement or backward movement.

According to another embodiment of the present invention, the lower frame 2220 and the base frame 2210 may not be separated to be formed integrally, and the lower frame 2220 may be fixed without moving along the base frame 2210. For example, the lower frame 2220 may be fixed without sliding forward or backward.

Specifically, the moving wheel may not be provided beneath the lower frame 2220, and a fixing member for fixing the lower frame 2220 and the base frame 2210 may be provided between the lower frame 2220 and the base frame 2210. In addition, the lower frame 2220 and the base frame 2210 may be integrally formed.

The lower frame 2220 according to an embodiment of the present invention may include at least one among a slide frame 2221, a support shaft frame 2222, a swing bracket 2223, and an upper and lower coupling frame 2224.

The slide frame 2221 may slide forward or backward along the base frame 2210. The slide frame 2221 may be disposed on the base frame 2210 to support the support shaft frame 2222.

The support shaft frame 2222 may serve as a support shaft for supporting the upper frame 2230. In addition, the entire upper frame 2230 of the main frame 2110 according to an embodiment of the present invention may move forward and backward, and in this case, the support shaft frame 2222 may serve as a central axis. One end of the support shaft frame 2222 may be coupled to the slide frame 2221, and the other end thereof may be coupled to the swing bracket 2223.

The swing bracket 2223 supports the upper frame 2230 and allows the upper frame 2230 to rotate around the support shaft frame 2222. An upper and lower portion coupling frame 2224 may be coupled to the upper surface of the swing bracket 2223. When one end and the other end of the upper and lower portion coupling frame 2224 move, the swing bracket 2223 may serve to maintain the balance of the upper and lower portion coupling frame 2224.

The cross section of the swing bracket 2223 according to an embodiment may have a triangular shape, but is not limited thereto. In a case in which the cross section of the swing bracket 2223 has a triangular shape, the support shaft frame 2222 may be inserted into a first vertex portion of the swing bracket 2223. In addition, although the coupling member simultaneously penetrates the first vertex portion of the swing bracket 2223 and the support shaft frame 2222, the swing bracket 2223 and the support shaft frame 2222 may be coupled, but the coupling method is not limited thereto. In this instance, a first bottom side portion (the upper surface of the swing bracket 2223) facing the first vertex of the swing bracket 2223 may be coupled to the upper and lower portion coupling frame 2224.

The upper and lower portion coupling frame 2224 may couple the lower frame 2220 and the upper frame 2230. A portion of the bottom surface of the upper and lower portion coupling frame 2224 according to an embodiment may be coupled to the swing bracket 2223. Furthermore, one end and the other end of the upper and lower portion coupling frame 2224 according to an embodiment may be coupled to the upper frame 2230. More specifically, one end and the other end of the upper and lower portion coupling frame 2224 according to an embodiment may be coupled to a side connection frame 2234 of the upper frame 2230. The upper and lower portion coupling frame 2224 may also move depending on the movement of the side connection frame 2234.

A frame actuator 2250 may be disposed on the lower frame 2220 according to an embodiment of the present invention.

The frame actuator 2250 may provide a driving force for moving at least one among a rear connection frame 2236, a lower frame 2220, an upper frame 2230, and a leg frame (not shown) of the leg massage unit. The frame actuator 2250 according to an embodiment of the present invention may include at least one among a back angle actuator 2251, a swing motion actuator 2252, a sliding actuator (not shown), and a leg angle actuator (not shown).

The back angle actuator 2251 may adjust the angle of the back frame 2232. One side of the back angle actuator 2251 according to an embodiment may be fixed to the lower frame 2220, and the other side thereof may be fixed to the rear connection frame 2236. The back angle actuator 2251 may adjust the angle of the back frame 2232 by moving the rear connection frame 2236 forward and backward.

The swing motion actuator 2252 may adjust an angle of the upper frame 2230. One side of the swing motion actuator 2252 according to an embodiment may be fixed to the upper frame 2230, and the other side thereof may be fixed to the lower frame 2220. The swing motion actuator 2252 may adjust an angle of the entire upper frame 2230 by moving the upper frame 2230 forward and backward.

The sliding actuator (not shown) may slidably move the body massage unit 2100. One side of the sliding actuator (not shown) according to an embodiment may be fixed to the base frame 2210, and the other side thereof may be fixed to the lower frame 2220. The sliding actuator (not shown) moves the lower frame 2220 forward and backward so that the lower frame 2220 can slide forward or backward along the base frame 2210, thereby allowing the body massage unit 2100 to slide.

The leg angle actuator (not shown) may adjust the angle of the leg massage unit. One side of the leg angle actuator (not shown) according to an embodiment may be fixed to the upper frame 2230, and the other side thereof may be fixed to the leg frame (not shown). The leg angle actuator (not shown) may adjust the angle of the leg massage unit by moving the leg frame (not shown) forward and backward.

The upper frame 2230 may serve as a framework supporting the body of the user. The upper frame 2230 according to an embodiment may support the user's buttocks and back. The upper frame 2230 may be supported by the lower frame 2220. The massage module 2170 may be disposed on the upper frame 2230 to massage the user's body.

The upper frame 2230 according to an embodiment of the present invention may include at least one among the buttock frame 2231, the back frame 2232, an anti-transforming frame 2233, the side connection frame 2234, the connection bracket 2235, the rear connection frame 2236, and a front connection frame 2237.

The buttock frame 2231 may support the user's buttocks. The buttock frame 2231 may be formed in plural, and the plurality of buttock frames 2231 may face each other on both sides of the lower frame 2220. The buttock frames 2231 according to an embodiment may be formed separately from the back frame 2232. The buttock frames 2231 may be respectively provided with buttock rack gears.

The buttock rack gears are used to guide the movement of the massage module 2170, and may include a plurality of rack gear protrusions and a plurality of rack gear grooves. The buttock rack gears may be disposed at both sides of the buttock frames 2231 to face each other, and the massage module 2170 may move along the buttock rack gears. The buttock rack gear may be provided on the buttock frame 2231 as a separate member, or may be formed in a pattern shape on a portion of the buttock frame 2231.

The back frame 2232 may support the user's back. The back frame 2232 may be disposed adjacent to the buttock frame 2231. The back frames 2232 may be disposed at both sides of the lower frame 2220 to face each other. The back frame 2232 may be separated from the buttock frame 2231 and may move as a separate frame in order to allow a change in angle with the buttock frame 2231.

The back frame 2232 according to an embodiment may be formed in various shapes. For example, the back frame 2232 may be divided into an I frame, an S frame, or the like according to the form thereof, but is not limited thereto.

The I frame refers to a frame in which at least a portion of the back frame 2232 is formed in an "I" shape. The S frame refers to a frame in which at least a portion of the back frame 2232 has a curved shape like "S". In a case in which the massage module 2170 is provided in the I frame, the massage module 2170 may move in a straight line along the I frame.

The back frame 2232 may be provided with back rack gears. The back rack gears may guide the movement of the massage module 2170, and may include a plurality of rack gear protrusions and a plurality of rack gear grooves. The back rack gears may be disposed at both sides of the back frame 2232 to face each other, and the massage module 2170 may move along the back rack gears. The back rack gears may be provided on the back frame 2232 as a separate member, or may be formed in a pattern shape in a portion of the back frame 2232.

The buttock frame 2231 and the back frame 2232 according to an embodiment of the present invention may be formed as separate frames, and may be disposed to be adjacent to each other. An angle adjustment protrusion may be disposed at a lower portion of one end of the buttock frame 2231 or the back frame 2232 according to an embodiment of the present invention, and an angle adjustment guide having a protrusion insertion groove may be provided at a lower portion of one end of the buttock frame 2231 or the back frame 2232 on which the angle adjustment protrusion is not disposed. As the angle adjustment protrusion is inserted into the protrusion insertion groove of the angle adjustment guide, the buttock frame 2231 and the back frame 2232 may maintain a predetermined interval without being spaced apart from each other over the predetermined interval while the angle between the buttock frame 2231 and the back frame 2232 is adjusted.

The buttock frame 2231 and the back frame 2232 according to an embodiment of the present invention may be made of a plastic material or a metal material, but are not limited thereto. The buttock rack gear may be formed in a pattern shape on the buttock frame 2231 according to an embodiment of the present invention, and the back rack gear may be formed in a pattern shape on the back frame 2232. In this case, the buttock frame 2231 and the back frame 2232 may be made of a plastic material.

In a case in which the back frame 2232 is made of a plastic material, in order to prevent the back frame 2232 from being transformed or shaken, the anti-transforming frame 2233 may be disposed on a side portion of the back frame 2232 to support the back frame 2232. For example, the anti-transforming frame 2233 may be formed of iron, an alloy, steel, or the like, but is not limited thereto, and may be made with various rigid materials.

The side connection frame 2234 may fix the buttock frame 2231 to the lower frame 2220. One surface of the side connection frame 2234 according to an embodiment may be coupled to the buttock frame 2231, and the other surface of the side connection frame 2234 may be coupled to the lower frame 2220. More specifically, the side connection frame

2234 according to an embodiment may be coupled to the upper and lower portion coupling frame 2224 of the lower frame 2220.

The connection bracket 2235 may connect the anti-transforming frame 2233 and the side connection frame 2234. The connection bracket 2235 according to an embodiment may be formed in a triangular thin plate shape so that a first vertex portion may be coupled to the anti-transforming frame 2233, a second vertex portion may be coupled to the side connection frame 2234, and a third vertex portion may be coupled to the rear connection frame 2236, but is not limited thereto. The connection bracket 2235 may include a first connection bracket and a second connection bracket disposed on both sides of the lower frame 2220 to face each other.

Meanwhile, the connection bracket 2235 may be disposed separately from the anti-transforming frame 2233, but may be integrally formed by being extended from the anti-transforming frame 2233.

The rear connection frame 2236 may connect the back frame 2232 and the back angle actuator 2251. The rear connection frame 2236 may be connected to the back frame 2232 through the connection bracket 2235 and the anti-transforming frame 2233. Accordingly, in a case in which the rear connection frame 2236 is moved, the angle of the back frame 2232 may be adjusted. The rear connection frame 2236 may be connected to the back angle actuator 2251, and the back angle actuator 2251 may move the rear connection frame 2236 forward and backward, thereby adjusting the angle of the back frame 2232. The rear connection frame 2236 may be coupled to the third vertex portion of the connection bracket 2235, and may be coupled between a first connection bracket and a second connection bracket.

The front connection frame 2237 may connect the upper frame 2230 and the swing motion actuator 2252. The front connection frame 2237 according to an embodiment may be coupled to the side connection frame 2234 of the upper frame 2230. Accordingly, in a case in which the front connection frame 2237 is moved, the angle of the entire upper frame 2230 may be adjusted.

The massage module 2170 may be disposed on the upper frame 2230 according to an embodiment of the present invention.

The massage module 2170 may provide a dynamic stimulation to at least one among the head portion, the back portion, and the buttock portion of the user. The massage module 2170 may move upward or downward along the buttock frame 2231 and the back frame 2232.

Meanwhile, the conventional massage apparatus cannot adjust the angle between the buttock frame and the back frame since the buttock frame and the back frame are formed as one frame. Accordingly, the conventional massage apparatus has inconvenience in that the user needs to receive massage in the same posture. In addition, even if the conventional massage apparatus adjusts the angle between the buttock frame and the back frame, it is difficult for the massage module 2170 to move between the buttock frame and the back frame.

The massage apparatus 100 according to an embodiment of the present invention may adjust the angle between the buttock frame 2231 and the back frame 2232 by separating the buttock frame 2231 and the back frame 2232. In addition, since the massage apparatus 100 according to an embodiment of the present invention includes the guide module in the massage module 2170, it is possible to prevent the massage module 2170 from being separated between the buttock frame 2231 and the back frame 2232.

The buttock rack gear or the back rack gear may include a rack gear of a back-and-forth direction and a rack gear of a vertical direction. In the present invention, the back-and-forth direction refers to a direction heading from the massage module 2170 toward the user or from the user to the massage module 2170, and may also be referred to as a Z-axis direction.

The massage module 2170 may include a gear engaged with the buttock rack gear or the back rack gear. More specifically, the massage module 2170 may include gears respectively engaged with the rack gear of the back-and-forth direction and the rack gear of the vertical direction. The gears are rotated by the actuator disposed in the massage module 2170, so that the massage module 2170 may move forward, backward, upward, or downward.

As the massage module 2170 moves forward, the strength of massage may be increased. Moreover, as the massage module 2170 moves backward, the strength of massage may be decreased.

The rack gear may be formed of a metal material or a plastic material. For example, the rack gear may be made of iron, steel, alloy, reinforced plastic, melamine resin, phenol resin, or the like, but is not limited thereto.

FIGS. 2 and 3 illustrate a case in which the upper frame 2230 is a full-flat frame, but the present invention is not limited thereto. The upper frame 2230 may be formed in various shapes. For example, the upper frame 2230 may be one selected among an S frame, an L frame, an S&L frame, and a double S&L frame according to the shape of the upper frame, but is not limited thereto.

The S frame refers to a frame in which at least a portion of the upper frame 2230 has a curved shape like “S”. The L frame refers to a frame in which at least a portion of the upper frame 2230 is bent like “L”, the S&L frame refers to a frame having both of the curved shape like “S” and the bent shape like “L”, and the double S&L frame refers to a frame having the curved shape like “L” and the curved shape like “S” formed at two portions.

Figure 4:
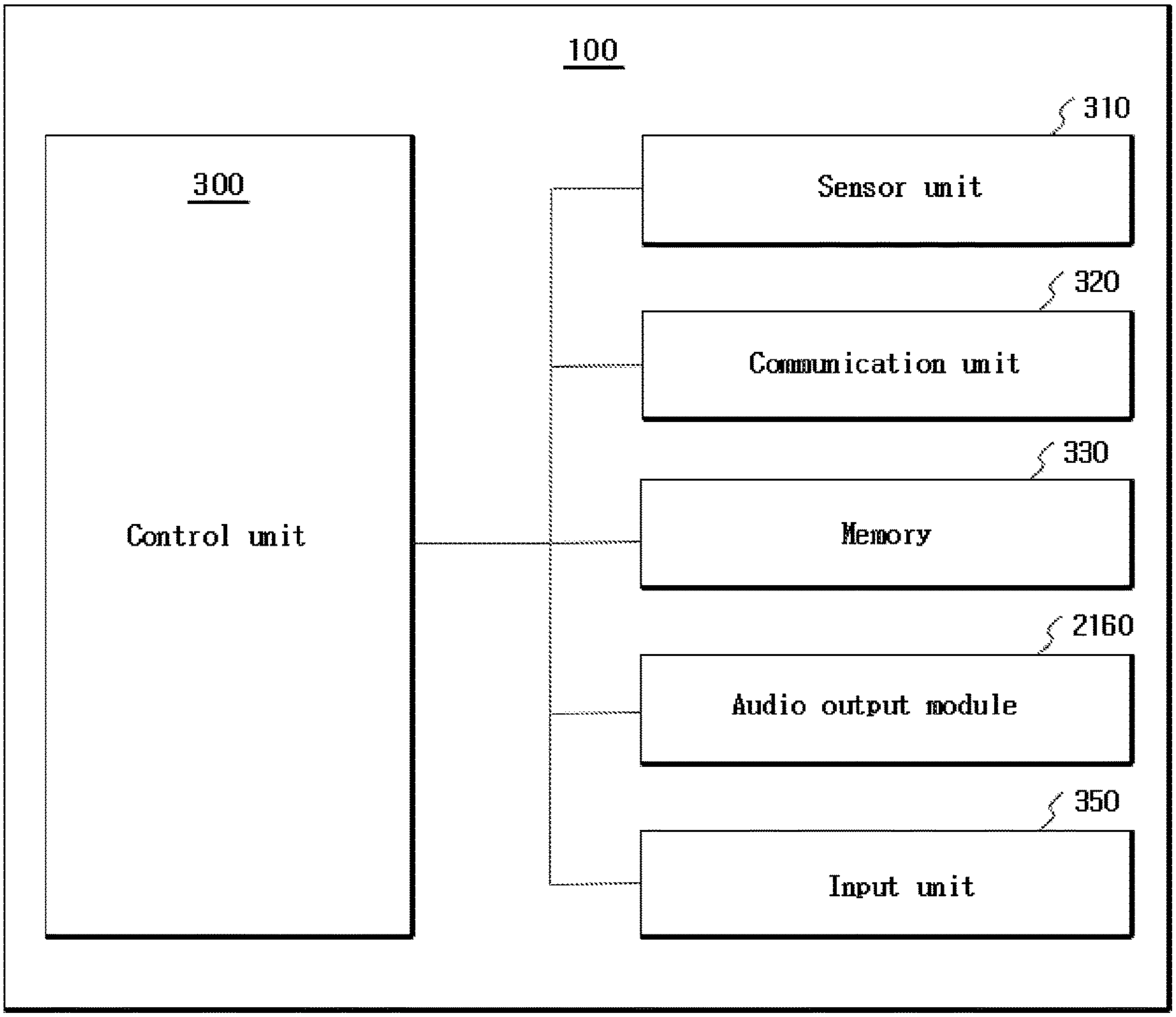
FIG. 4 is a view illustrating a massage apparatus according to an embodiment of the present invention.

FIG. 4 is a view illustrating a massage apparatus according to an embodiment of the present invention.

The massage apparatus 100 may include at least one among a control unit 300, a sensor unit 310, a communication unit 320, a memory 330, an audio output unit 2160, and an input unit 350. The control unit 300 may include at least one processor and a memory. The at least one processor may perform instructions stored in the memory.

The control unit 300 may control the operation of the massage apparatus 100. The control unit 300 may include one processor or may include a plurality of processors. In a case in which the control unit 300 includes a plurality of processors, at least a portion of the plurality of processors may be physically spaced apart from each other. In addition, the massage apparatus 100 is not limited thereto and may be implemented in various ways.

According to an embodiment of the present invention, the control unit 300 may control the operation of the massage apparatus 100. For example, the massage apparatus 100 may include a plurality of actuators. The massage apparatus 100 may control the operation of the massage apparatus 100 by controlling the operation of the plurality of actuators. For example, the massage apparatus 100 may include at least one among a driving unit for moving an armrest frame support unit, a massage module moving actuator, at least one actuator included in the massage module, a back angle actuator, a leg angle actuator, a foot massage actuator, a leg length adjusting actuator, and a sliding actuator, and the control unit 300 may control the operation of the massage apparatus 100 by controlling them.

The massage module moving actuator is an actuator that enables vertical movement of the massage module 2170, and the massage module 2170 may move along the rack gear by the operation of the massage module moving actuator.

The back angle actuator is an actuator that adjusts an angle of a portion where the back of the user gets in contact with the massage apparatus 100, and the back angle of the massage apparatus 100 may be adjusted by the operation of the back angle actuator.

The leg angle actuator is an actuator for adjusting an angle of the leg massage unit 2300 of the massage apparatus 100. An angle between the leg massage unit 2300 and the body massage unit 2100 may be adjusted by the operation of the leg angle actuator.

The foot massage actuator is an actuator that operates the foot massage module included in the leg massage unit 2300. The massage apparatus 100 may provide foot massage to the user by using the foot massage actuator.

The massage module 2170 may include at least one actuator, and the control unit 300 may operate at least one actuator to provide various massage motions. For example, the control unit 300 may operate at least one actuator included in the massage module 2170 to provide a tapping massage, a kneading massage, and the like, and may provide various massage operations without being limited thereto.

The leg length adjusting actuator represents an actuator that adjusts the length of the leg massage unit 2300. For example, the control unit 300 may adjust the length of the leg massage unit 2300 to be suitable for the user by using the leg length adjusting actuator, and as a result, the user may receive massage suitable for the user's body shape.

The sliding actuator enables a sliding motion of the massage apparatus 100. For example, a horizontal base upper frame may move forward or backward by the operation of the sliding actuator, and as a result, the upper frame connected to the horizontal base upper frame may also move forward or backward.

The memory 330 may be included in the control unit 300 or may be located outside the control unit 300. The memory 330 may store various pieces of information related to the massage apparatus 100. For example, the memory 330 may include massage control information and personal authentication information, but is not limited thereto.

The memory 330 may be implemented through a non-volatile storage medium capable of continuously storing arbitrary data. For example, the memory 330 may include not only a disk, an optical disk, and a magneto-optical storage device, but also a storage device based on a flash memory and/or a battery-backup memory, but is not limited thereto.

The memory 330 may be a primary storage device, to which a processor directly accesses, like a random access memory (RAM), such as a dynamic random access memory (DRAM), a static random access memory (SRAM), or the like. The memory 330 may mean a volatile storage device in which stored information is instantaneously erased when power is turned off, but is not limited thereto. The memory 330 may be operated by the control unit 300.

The massage apparatus 100 may include a sensor unit 310. The sensor unit 310 may acquire various information using at least one sensor. The sensor unit 310 may be a sensor using a measurement means such as pressure, potential, and optics. For example, the sensor may include a pressure sensor, an infrared sensor, an LED sensor, a touch sensor, and the like, but is not limited thereto.

In addition, the sensor unit 310 may include a biometric information acquisition sensor. The biometric information acquisition sensor may acquire fingerprint information, face information, voice information, iris information, weight information, electrocardiogram information, body composition information, and the like, but is not limited thereto, and may include various pieces of biometric information.

According to another embodiment of the present invention, the massage apparatus 100 may sense a contact area and/or a contact position with the user through sensors. Furthermore, the massage apparatus 100 may provide a customized massage based on information acquired through sensors. In addition, the massage apparatus 100 may include a communication unit. The communication unit of the massage apparatus 100 may receive a signal from an external device. The control unit 300 may process the received signal to obtain a result signal. The communication unit may output the result signal to the external device.

The communication unit 320 may communicate with a module inside the massage apparatus 100, an external massage apparatus, and/or a user terminal through any type of network. The communication unit may include a wired/wireless access module for network access. The wireless access technology may include, for example, wireless LAN (WLAN) (Wi-Fi), wireless broadband (Wibro), world interoperability for microwave access (Wimax), high speed efficient downlink alliance (HSDPA), and the like. The wired access technology may include, for example, digital subscriber line (XDSL), fibers shop to the home (FTTH), power line communication (PLC), and the like. In addition, the network connection unit may include a short-range communication module to transmit and receive data to and from any device/terminal located at a short distance. For example, the short-range communication technology may include Bluetooth, radio frequency identification (RFID), infrared data security association (IrDA), ultra-wideband (UWB), ZigBee, and the like, but is not limited thereto.

Additionally, the massage apparatus 100 may further include an input unit 350 or an output unit. The massage apparatus 100 may receive an input from the user by using the input unit 350. In addition, the massage apparatus 100 may output the processed result of the control unit 300 to the output unit.

Specifically, the input unit 350 may receive a command related to the operation control of the massage apparatus 100 from the user, and the input unit 350 may be implemented in various forms. For example, the input unit 350 may be provided in the body massage unit 2100, or may be provided in the leg massage unit 2300, but is not limited thereto. Moreover, the input unit 350 may include a user input unit 2180, the massage apparatus control device 2200 of FIG. 1, or various external devices to be described referring to FIG. 4.

The massage apparatus 100 may acquire various commands from the user through the input unit 350. For example, the massage apparatus 100 may receive commands related to section of a massage module, selection of a massage type, selection of massage intensity, selection of massage time, selection of a massage area, selection of a position and an operation of the body massage unit 2100, selection of ON and OFF of power of the massage apparatus 100, selection of whether to operate a thermal function, selection related to sound reproduction, and the like, but is not limited thereto.

The massage apparatus 100 may provide an interface for selecting a massage mode. For example, the input unit 350 or the output unit may include a massage apparatus control device 2200. A medical massage list of various modes related to body improvement may be listed through the massage apparatus control device 2200.

The medical massage mode may include at least one among a concentration mode, a meditation mode, a recovery mode, a stretching mode, a sleep mode, a vital mode, a golf mode, a hip-up mode, an examinee mode, a gravity-free mode, and a growth mode.

According to another embodiment of the present invention, the input unit 350 may include buttons of a hot key type and/or selection buttons for selection, cancellation and input, according to preset user setting functions or preset self-setting functions.

The input unit 350 may be implemented as a keypad, a dome switch, a (static pressure type/capacitive) touch pad, a jog wheel, a jog switch, or the like, but is not limited thereto. Furthermore, the input unit 350 may obtain commands through the utterance of the user based on the voice recognition technology.

According to an embodiment of the present invention, the output unit may include a display for displaying an operation situation of the massage apparatus 100 or a current state of the user. In this case, the display may include at least one among a liquid crystal display (LCD), a thin film transistor-liquid crystal display (TFT-LCD), an organic light-emitting diode (OLED) display, a flexible display, and a three-dimensional (3D) display, but is not limited thereto.

The output unit may include an audio output unit 340. The audio output unit 340 may provide a user with an audio output of any form. For example, the audio output unit 340 may output a sound source and/or a binaural beat optimized for a massage pattern provided by the massage apparatus 100 to the user, thereby providing a brain stimulation to the user. The audio output unit 340 may output a sound signal received through a network (not illustrated) or stored in an internal/external storage medium (not illustrated). For example, the audio output unit 340 may output a sound source according to the control of the user terminal through a network connection (e.g., Bluetooth connection, etc.) with the user terminal. Additionally, the audio output unit 340 may output a sound signal generated in relation to the operation of the massage apparatus 100.

It will be appreciated by those skilled in the art that the present invention may be implemented in combination with other program modules and/or through a combination of hardware and software. For example, the present invention may be implemented by a computer-readable medium.

Any of media accessible by a computer may be a computer-readable medium. Such a computer-readable medium may include a volatile medium, a non-volatile medium, a transitory medium, a non-transitory medium, a movable medium, and an unmovable medium. For example, the computer-readable medium may include a computer-readable storage medium and a computer-readable transmission medium.

The computer-readable storage medium includes a volatile medium, a non-volatile medium, a transitory medium, a non-transitory medium, a movable medium, and an unmovable medium implemented by computer-readable commands, a data structure, a program module, or a method or technology for storing information like data. The computer-readable storage medium includes a memory technology, such as a RAM, a ROM, an EEPROM, a flash memory or the like, a magnetic storage device, such as a CD-ROM, a digital video disk (DVD) or the like, a magnetic storage device, such as a magnetic cassette, a magnetic tape, a magnetic disk storage or the like that can be accessed by a computer and that can be used to store desired information, but is not limited thereto.

Figure 5:
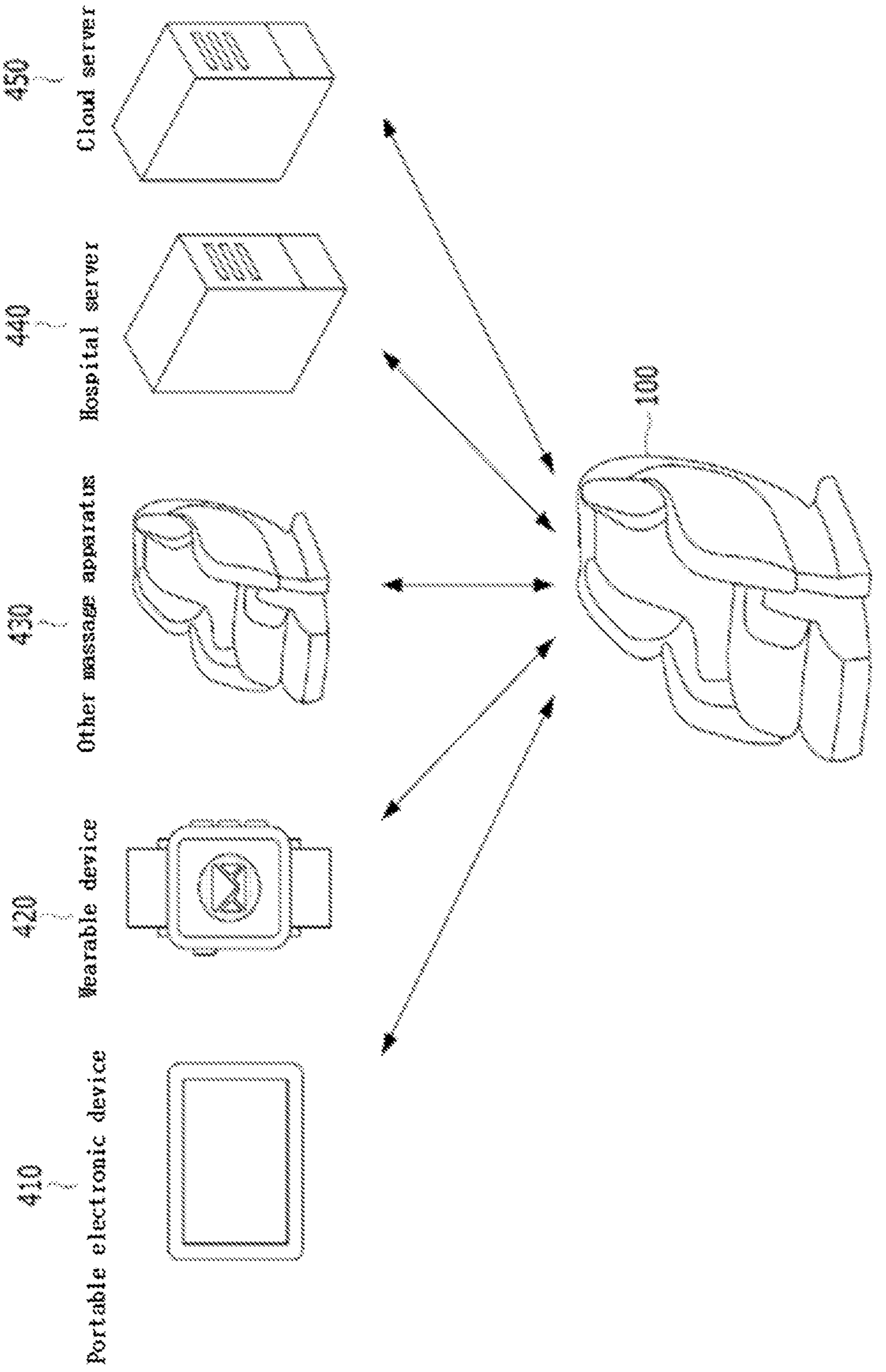
FIG. 5 is a view illustrating an external device capable of communicating with a massage apparatus according to an embodiment of the present invention.

FIG. 5 is a view illustrating an external device capable of communicating with the massage apparatus 100 according to an embodiment of the present invention.

The massage apparatus 100 may communicate with an external device in a wired or wireless manner to transmit and receive various data.

The external device may include a portable electronic device 410, such as an AI speaker, a tablet, or a smartphone. The portable electronic device 410 may be only for the massage apparatus 100 or may be a general-purpose portable electronic device. In addition, the external device may include a wearable device 420 such as a smart watch or a smart band. The external device may not include the massage apparatus 100 currently used by the user but other massage apparatus 430. The external device may include a hospital server 440. The external device may include a personal health record (PHR) server. Furthermore, the external device may include a cloud server 450. The external device may include a medical measurement device, such as an electronic scale, a blood glucose monitoring device, or a blood pressure meter.

Although some examples of the external device are described in the present invention, it should be understood that all kinds of devices capable of communicating with the massage apparatus 100 and sending and receiving information with the massage apparatus 100 in a wired or wireless manner may be included in an external device.

Figure 6:
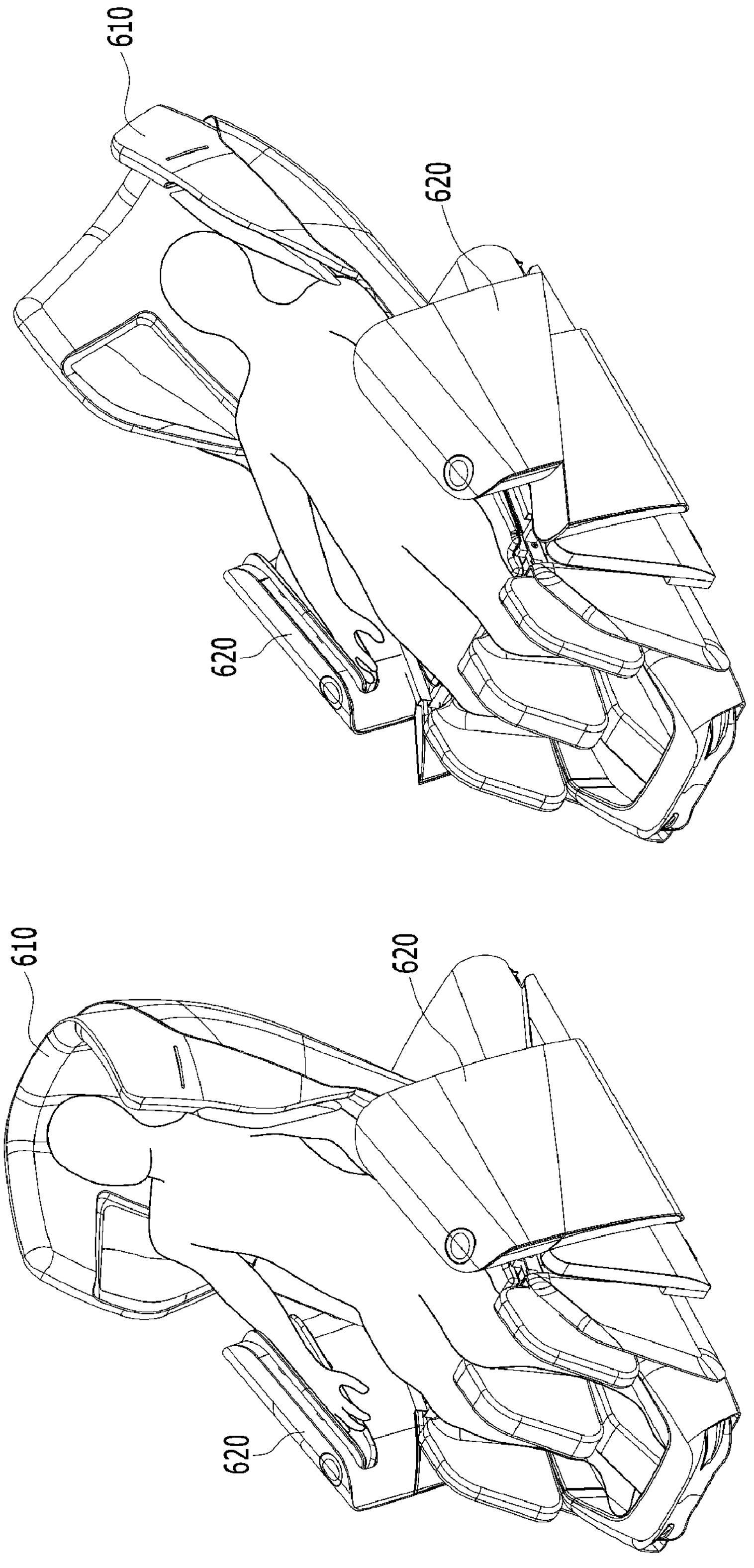
FIG. 6 is a view illustrating a massage apparatus according to an embodiment of the present invention.

FIG. 6 is a view illustrating a massage apparatus according to an embodiment of the present invention.

The massage apparatus 100 according to the present invention may include a massage apparatus body 610 and a side cover 620. Referring to the left drawing of FIG. 6, the massage apparatus 100 may provide massage to the user's legs, arms and body when the user sits on the massage apparatus. Additionally, referring to the right drawing of FIG. 6, the massage apparatus 100 may be tilted the back frame 2232 backward. When the back frame 2232 is tilted backward, the user may be in a lying state. In this instance, the side cover 620 including the arm massage unit may move backward and downward with respect to the massage apparatus 100. Since the side cover 620 moves backward and downward, the massage apparatus 100 may provide massage to the user's arm even if the user lies. In addition, the user may be provided with massage without inconvenience.

Figure 7:
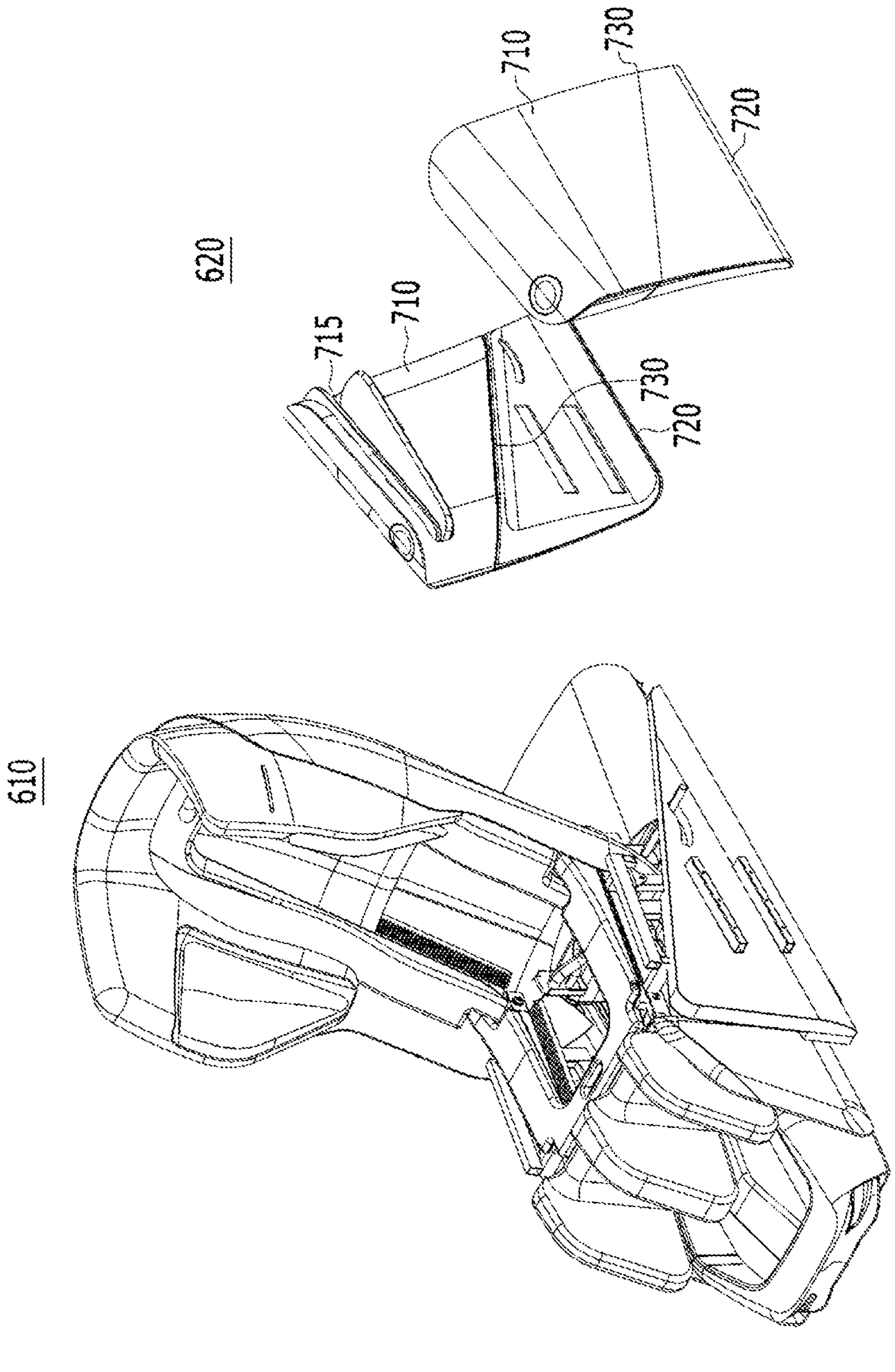
FIG. 7 is a view illustrating a massage apparatus according to an embodiment of the present invention.

FIG. 7 is a view illustrating a massage apparatus according to an embodiment of the present invention.

The massage apparatus 100 may be divided into a massage apparatus body 610 and a side cover 620. Since the massage apparatus 100 is separated as described above, the massage apparatus 100 may be easily delivered from a shop to the user. Furthermore, in a case in which the massage apparatus 100 is disassembled into the massage apparatus body 610 and the side cover 620, the massage apparatus 100 can pass through a door even though the massage apparatus 100 which is in an assembled state may not pass.

The side cover 620 may include an upper cover 710 and a lower cover 720. The upper cover 710 may include an arm massage unit 715. The upper cover 710 may move backward and downward or forward and upward along an inclined surface 730 of the lower cover 720. That is, the inclined surface 730 may be an interface that divides the upper cover 710 and the lower cover 720.

Figure 8:
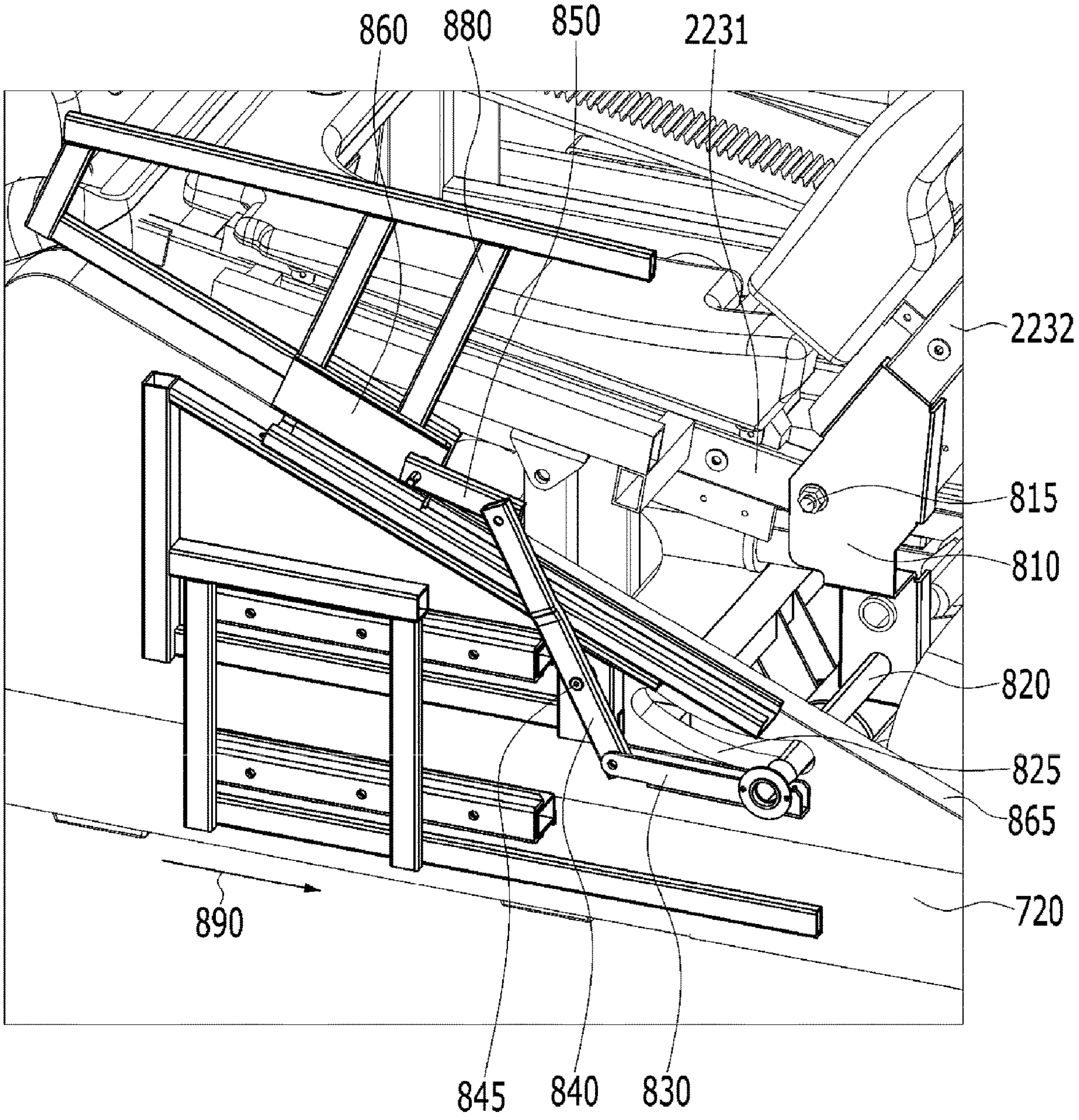
FIG. 8 is a view illustrating a side cover according to an embodiment of the present invention.

FIG. 8 is a view illustrating a side cover according to an embodiment of the present invention.

For convenience of description, FIG. 8 illustrates a state in which a portion of a housing of the side cover 620 is removed.

The massage apparatus 100 may include a frame connection part 810. The frame connection part 810 may connect the buttock frame 2231 included in the main frame 2110 and the back frame 2232 included in the main frame 2110. The frame connection part 810 may rotate around a frame rotation shaft 815 based on the movement of the back frame 2232. Here, the movement of the back frame 2232 means that the back frame 2232 is laid backward or is erected forward.

The frame rotation shaft 815 may be connected to the buttock frame 2231. One end of the frame connection part 810 may be connected to the back frame 2232.

The massage apparatus 100 may include a driving shaft 820. The driving shaft 820 may pass through the frame connection part 810. More specifically, the driving shaft 820 may pass through the other end of the frame connection part 810. The driving shaft 820 may move along a driving shaft slot 825 having a circular arc shape or an elliptical arc shape based on the movement of the back frame 2232. The driving shaft 820 may be a cylindrical rod.

The massage apparatus 100 may include a third link 830. One end of the third link 830 may be coupled to one end of the driving shaft 820. The third link 830 may be configured to transfer the movement of the driving shaft 820.

The massage apparatus 100 may include a second link 840. The other end of the third link 830 may be connected to one end of the second link 840. The second link 840 may rotate around a link rotation shaft 845 based on the movement of the third link 830. A length (hereinafter, a first length) ranging from the link rotation shaft 845 to one end of the second link 840 may be shorter than a length (hereinafter, a second length) ranging from the link rotation shaft 845 to the other end of the second link 840. Here, one end of the second link 840 is connected to the third link 830, and the other end of the second link 840 is connected to the first link 850. Since the first length is shorter than the second length as described above, even if one end of the second link 840 is slightly moved by the movement of the third link 830, the other end of the second link 840 may move relatively more.In addition, even if the driving shaft 820 is slightly moved along the driving shaft slot 825, an arm massage unit frame holder 860, an arm massage unit frame 880, or the upper cover 710 may move relatively more. The movement of the second link 840 will be described in more detail below.

The massage apparatus 100 may include a first link 850. The other end of the second link 840 may be connected to one end of the first link 850. The first link 850 may transmit the movement of the second link 840 to the arm massage unit frame holder 860.

The massage apparatus 100 may include the arm massage unit frame holder 860. The other end of the first link 850 may be connected to the arm massage unit frame holder 860. The arm massage unit frame holder 860 may include a protrusion. The protrusion of the arm massage unit frame holder 860 may be inserted into a rail groove of a sliding rail 870. The arm massage unit frame holder 860 may move along the sliding rail 870 based on the movement of the first link 850.

As described above, the side cover 620 may include the lower cover 720 and the upper cover 710. The lower cover 720 may have an inclined surface 865 that descends toward the back 890. The inclined surface 865 of FIG. 8 may be the same as the inclined surface 730 of FIG. 7. The lower cover 720 may be fixed to the main frame 2110 not to move. The sliding rail 870 may be disposed parallel to the inclined surface 865 of the lower cover 720.

The massage apparatus 100 may include an arm massage unit frame 880. The arm massage unit frame holder 860 may be connected to the arm massage unit frame 880. The arm massage unit frame 880 may be included in the upper cover 710. The arm massage unit frame 880 may move in parallel with the sliding rail 870 together with the arm massage unit frame holder 860.

The side cover 620 may include a first link 850, a second link 840, a third link 830, an arm massage unit frame holder 860, a driving shaft slot 825, an arm massage unit coupling groove, and a sliding rail 870. In addition, the lower cover 720 included in the side cover 620 may include a first link 850, a second link 840, a third link 830, a driving shaft slot 825, an arm massage unit coupling groove, and a sliding rail 870. Moreover, the upper cover 710 included in the side cover 620 may include an arm massage unit frame holder 860 and an arm massage unit frame 880. The arm massage unit frame 880 may be a frame of the arm massage unit. The upper cover 710 may include an arm massage unit. The arm massage unit may include a plurality of air cells, and the plurality of air cells may apply pressure to the user to provide massage.

Figure 9:
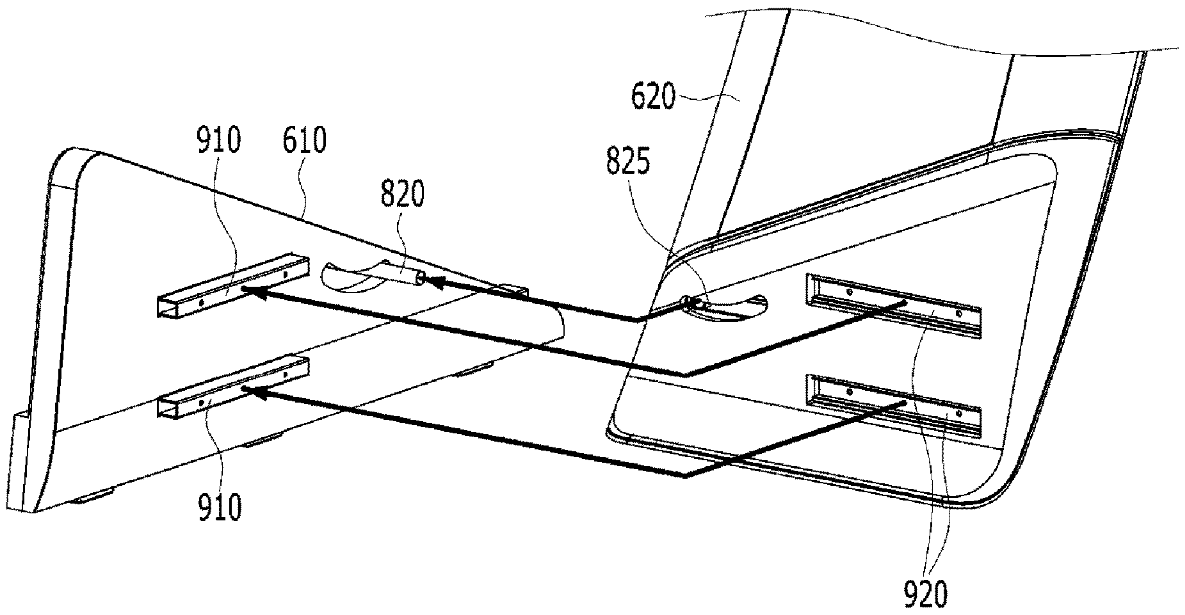
FIG. 9 is a view illustrating a side cover according to an embodiment of the present invention.

FIG. 9 is a view illustrating a side cover according to an embodiment of the present invention.

As described above, the side cover 620 may be separable from the massage apparatus 100. The separation of the side cover 620 from the massage apparatus 100 means that the side cover 620 is separated from the main frame 2110 of the massage apparatus 100. When the side cover 620 is separated from the massage apparatus 100, the massage apparatus 100 may be moved for each component so as to easily pass through a narrow passage.

FIG. 9 illustrates a method of coupling the separated side cover 620 to the massage apparatus body 610. The massage apparatus body 610 may include a main frame 2110. Since the main frame 2110 is a frame of the massage apparatus body 610, the side cover 620 may be coupled to a component of the main frame 2110, and thus may be coupled to the massage apparatus body 610. Hereinafter, a method of coupling the massage apparatus body 610 and the side cover 620 will be described.

A main frame protrusion 910 included in the main frame 2110 may be inserted into the arm massage unit coupling groove 920 included in the side cover 620. The arm massage unit coupling groove 920 may be included in the lower cover 720 of the side cover 620. Since the main frame protrusion 910 is coupled to the arm massage unit coupling groove 920, the lower cover 720 included in the side cover 620 may be fixed to the main frame. That is, the lower cover 720 may not move. The main frame protrusion 910 and the arm massage unit coupling groove 920 may be coupled by a coupling component penetrating the main frame protrusion 910 and the arm massage unit coupling groove 920. The driving shaft 820 may be inserted into the driving shaft slot 825 included in the side cover 620. As described above, the side cover 620 may be coupled to the massage apparatus 100. A process in which the side cover 620 is coupled to the massage apparatus body 610 will be described with reference to FIG. 10.

Figure 10:
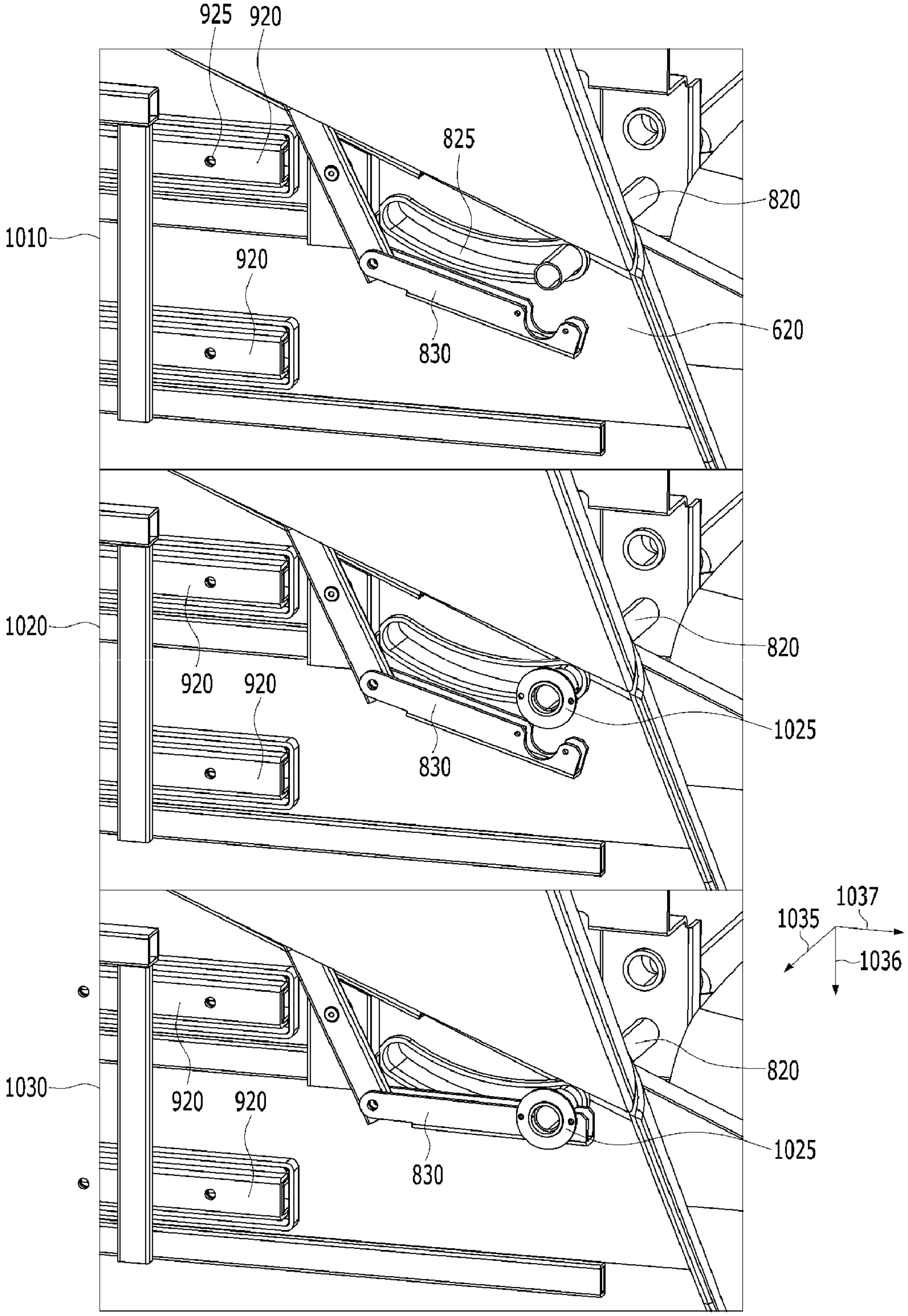
FIG. 10 is a view illustrating a process in which a side cover according to an embodiment of the present invention is coupled to a main body.

FIG. 10 is a view illustrating a process in which the side cover is coupled to the main body of the massage apparatus according to an embodiment of the present invention.

For convenience of description, FIG. 10 illustrates a state in which a portion of the housing of the side cover 620 is removed. A person who assembles the massage apparatus may remove the housing of the side cover 620 to couple the side cover 620 to the main body of the massage apparatus 100. FIG. 10 is a left side view of the massage apparatus 100. As described with reference to FIG. 9, the driving shaft 820 may be inserted into the driving shaft slot 825 included in the side cover 620.

Referring to the drawing 1010 of FIG. 10, the inserted driving shaft 820 may protrude through the driving shaft slot 825 of the side cover 620. The drive shaft slot 825 may have an arc shape in which the ground direction 1036 is convex. The ground direction may refer to a downward direction.

Referring to the drawing 1020 of FIG. 10, the massage apparatus 100 may further include a driving shaft plunger 1025 connecting the driving shaft 820 and the third link 830. The driving shaft 820 may be inserted into a groove of the driving shaft plunger 1025. The driving shaft 820 may rotate within the driving shaft plunger 1025.

Referring to the drawing 1030 of FIG. 10, the driving shaft plunger 1025 may be coupled to the third link 830. That is, the driving shaft plunger 1025 may be fixed to the third link 830. The driving shaft plunger 1025 may not be separated from the driving shaft 820 since fastened to the third link 830. The driving shaft plunger 1025 may be coupled to the third link 830 not to move in the longitudinal direction 1035 of the driving shaft 820. Here, the longitudinal direction 1035 may mean a horizontal direction when the user sits on the massage apparatus 100. The longitudinal direction 1035 may also be substantially perpendicular to a ground direction 1036 and a backward direction 1037.

In addition, the drawings 1010 to 1030 of FIG. 10 illustrate the arm massage unit coupling groove 920. The arm massage unit coupling groove 920 of FIG. 10 are located on the opposite side of the arm massage unit coupling groove 920 of FIG. 9. The arm massage unit coupling groove 920 of the side cover 620 may be coupled to the main frame protrusion 910 when a coupling component such as a screw is inserted into a hole 925 of the arm massage unit coupling groove 920 of FIG. 10. According to the above-described process, the side cover 620 may be coupled to the massage apparatus body 610. After the assembly of the side cover 620 is finished, the user may combine the housing of the side cover 620 with the side cover 620 to complete the assembly of the massage apparatus 100. In addition, the first link 850 to the third link 830 included in the side cover 620 may not be visible to the user by the housing.

Figure 11:
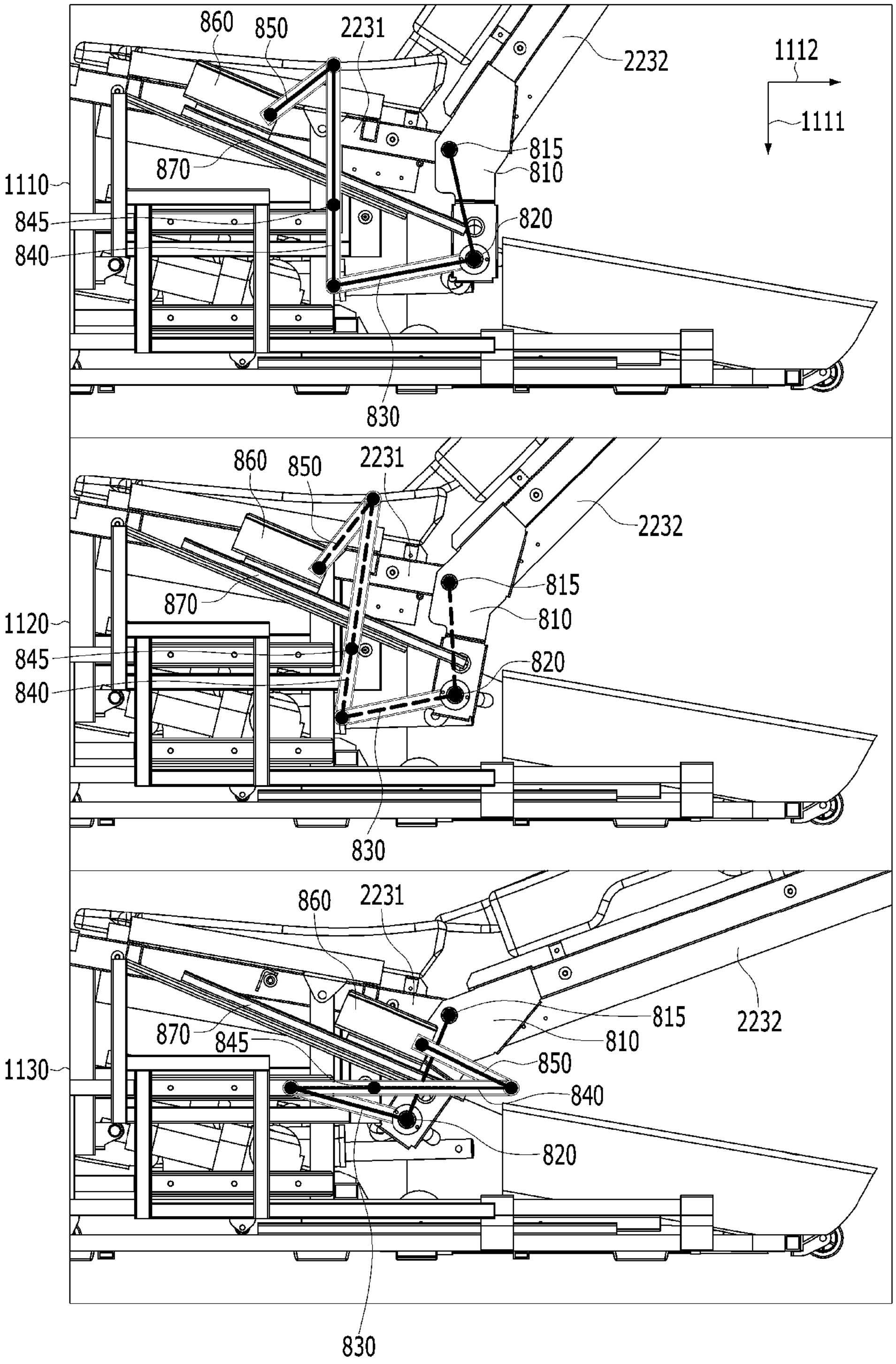
FIG. 11 is a view illustrating an operation of a massage apparatus according to an embodiment of the present invention.
Figure 12:
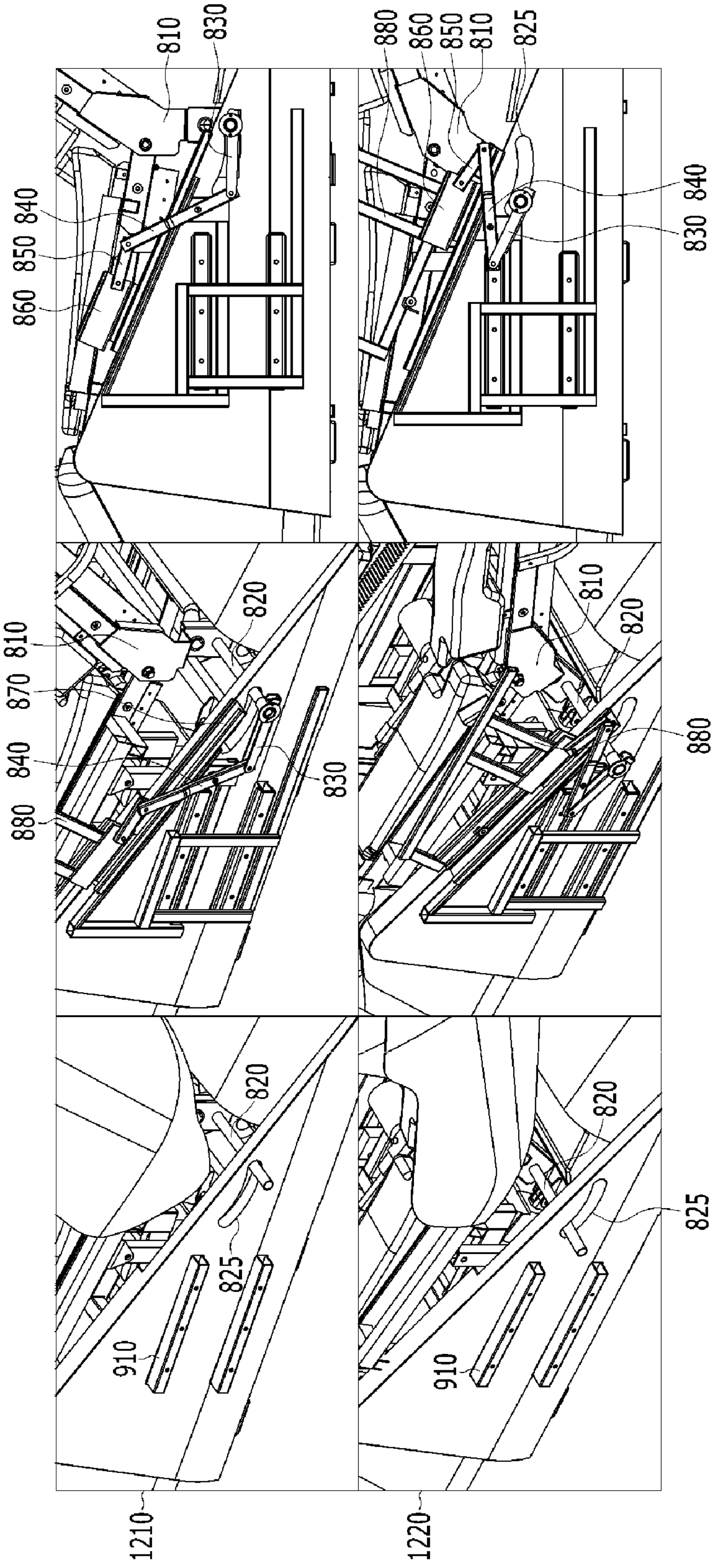
FIG. 12 is a view illustrating an operation of a massage apparatus according to an embodiment of the present invention.
Figure 13:
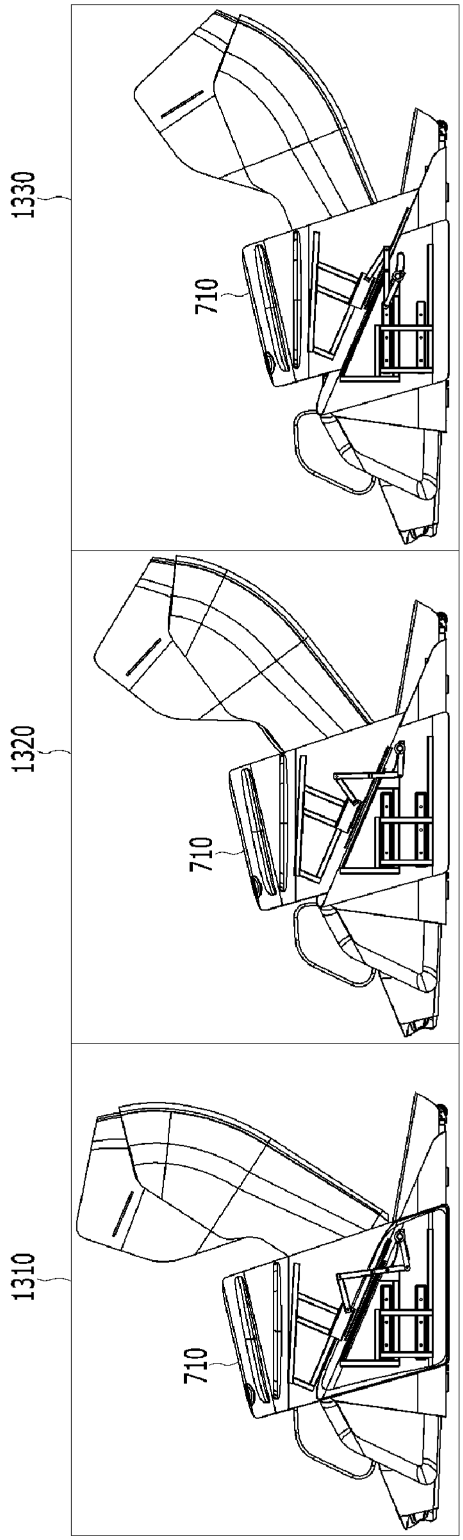
FIG. 13 is a view illustrating an operation of a massage apparatus according to an embodiment of the present invention.

FIG. 11 illustrates an operation of a massage apparatus according to an embodiment of the present invention. FIG. 12 illustrates an operation of a massage apparatus according to an embodiment of the present invention. FIG. 13 illustrates an operation of a massage apparatus according to an embodiment of the present invention.

For convenience of description, FIGS. 11, 12, and 13 illustrate a state in which a portion of the housing of the side cover 620 is removed. FIG. 12 shows a state of FIG. 11 viewed from another angle. FIG. 13 illustrates the massage apparatus 100 according to the angle of the back frame 2232. Hereinafter, referring to FIGS. 11, 12 and 13, the operation of the massage apparatus 100 will be described.

The drawing 1110 of FIG. 11 corresponds to the drawing 1210 of FIG. 12 and the drawing 1310 of FIG. 13. Referring to the drawing 1110 of FIG. 11, the drawing 1210 of FIG. 12 and the drawing 1310 of FIG. 13, the back frame 2232 is not laid down to the back 1112. The positions of the driving shaft 820, the first link 850, the second link 840, the third link 830, and the arm massage unit frame holder 860 may be the same as the drawing 1110 of FIG. 11.

The drawing 1120 of FIG. 11 corresponds to the drawing 1320 of FIG. 13. Referring to drawing 1120 of FIG. 11, the back frame (2232) starts to be gradually tilted toward the back 1112. In a case in which the back frame 2232 is tilted toward the back 1112, the frame connection part 810 may rotate around the frame rotation shaft 815. Based on the drawing 1120, the frame connection part 810 may rotate clockwise around the frame rotation shaft 815.

In a case in which the back frame 2232 is tilted toward the back 1112, the driving shaft 820 passing through the other end of the frame connection part 810 may move forward along the driving shaft slot 825. That is, the drive shaft 820 may be rotatable around the frame rotation shaft 815 of the frame connection part 810 along the arc-shaped drive shaft slot 825. The third link 830 connected to the driving shaft 820 may move one end of the second link 840 forward. Accordingly, the second link 840 may be rotated around the link rotation shaft 845. Based on the drawing 1120 of FIG. 11, the second link 840 may rotate clockwise round the link rotation shaft 845.

The other end of the second link may move toward the back 1112 by the rotation of the second link 840. In addition, the first link 850 connected to the other end of the second link 840 may move toward the back 1112 along the sliding rail 870 together with the arm massage unit frame holder 860.

As described above, the side cover 620 may include the lower cover 720 and the upper cover 710, and the lower cover 720 may have the inclined surface that descends backward. The inclined surface may be inclined at about 15° to 35° with respect to the ground. The lower cover 720 may be fixed to the main frame 2110 not to move, and the sliding rail 870 may be disposed parallel to the inclined surface of the lower cover 720. Accordingly, the movement of the arm massage unit frame holder 860 along the sliding rail 870 toward the back 1112 may mean that the arm massage unit frame holder 860 moves backward and downward 1111.

A length (hereinafter, a first length) ranging from the link rotation shaft 845 to one end of the second link 840 may be shorter than a length (hereinafter, a second length) ranging from the link rotation shaft 845 to the other end of the second link 840. Here, one end of the second link 840 is connected to the third link 830, and the other end of the second link 840 is connected to the first link 850. Since the first length is shorter than the second length as described above, even if one end of the second link 840 moves slightly by the movement of the third link 830, the arm massage unit frame holder 860, the arm massage unit frame 880, or the upper cover 710 may move relatively more.

The drawing 1130 of FIG. 11 corresponds to the drawing 1220 of FIG. 12 and the drawing 1330 of FIG. 13. Referring to the drawing 1130 of FIG. 11 corresponds to the drawing 1220 of FIG. 12 and the drawing 1330 of FIG. 13, the back frame 2232 may be completely tilted to the back 1112. In a case in which the back frame 2232 is tilted toward the back 1112, the frame connection part 810 may further rotate around the frame rotation shaft 815. Based on the drawing 1120, the frame connection part 810 may rotate clockwise around the frame rotation shaft 815.

In a case in which the back frame 2232 is tilted toward the back 1112, the driving shaft 820 passing through the other end of the frame connection part 810 may move forward along the driving shaft slot 825. The third link 830 connected to the driving shaft 820 may move one end of the second link

840 forward. Accordingly, the second link 840 may be rotated around the link rotation shaft 845. Based on the drawing 1130 of FIG. 11, the second link 840 may rotate clockwise around the link rotation shaft 845.

The other end of the second link may move toward the back 1112 by the rotation of the second link 840. In addition, the first link 850 connected to the other end of the second link 840 may move toward the back 1112 downward 111 along the sliding rail 870 together with the arm massage unit frame holder 860. Moreover, the arm massage unit frame holder 860 may be connected to the arm massage unit frame 880. The upper cover 710 may include an arm massage unit frame 880, and the arm massage unit frame 880 may be a frame of the upper cover 710. Based on the sliding rail 870 on the inclined surface, the arm massage unit frame 880 coupled to the arm massage unit frame holder 860 may lower toward the back. That is, the arm massage unit frame 880 may move toward the back 1112 downward along the sliding rail 870 by the arm massage unit frame holder 860.

Until now, the process of tilting the back frame 2232 backward has been described with reference to FIG. 11. The process of making the back frame 2232 stand may be performed in reverse order of the process described above. In a case in which the back frame 2232 is erected forward, the arm massage portion frame holder 860 may move forward along the sliding rail 870 by the first link 850, the second link 840, the third link 830, the driving shaft 820, and the frame connection part 810. In addition, the arm massage unit frame 880 coupled to the arm massage unit frame holder 860 may rise forward.

According to the present invention, even if the back frame 2232 is laid down or erected forward, the buttock frame 2231 may not move. Referring to FIG. 11, as the back frame 2232 is laid down toward the back 1112, the massage apparatus 100 may be changed as illustrated in the drawing 1130 from the drawing 1110. On the contrary, as the back frame 2232 is erected forward, the massage apparatus 100 may be changed as illustrated in the drawing 1110 from the drawing 1130. Referring to the drawings 1110 to 1130 of FIG. 11, the buttock frame 2231 may not move even if the back frame 2232 moves.

The frame rotation shaft 815 of the frame connection part 810 may pass through the buttock frame 2231 from side to side. Here, the term "from side to side" may mean a direction to penetrate into or out of the drawing. That is, the term "from side to side" may mean a direction perpendicular to the drawing. That is, the term "from side to side" may mean a direction perpendicular to the back 1112 and the bottom 1111. The frame connection part 810 may rotate around the frame rotation shaft 815 as the back frame 2232 is tilted toward the back 1112 or is erected forward. Since the buttock frame 2231 includes the rotation shaft 815 of the frame connection part 810, even if the frame connection part 810 rotates, the buttock frame may not move, but is not limited thereto. If necessary, the controller 300 of the massage apparatus 100 may control the buttock frame 2231 to move together with the back frame 2232. The buttock frame 2231 may be controlled to move independently of the back frame 2232.

Figure 14:
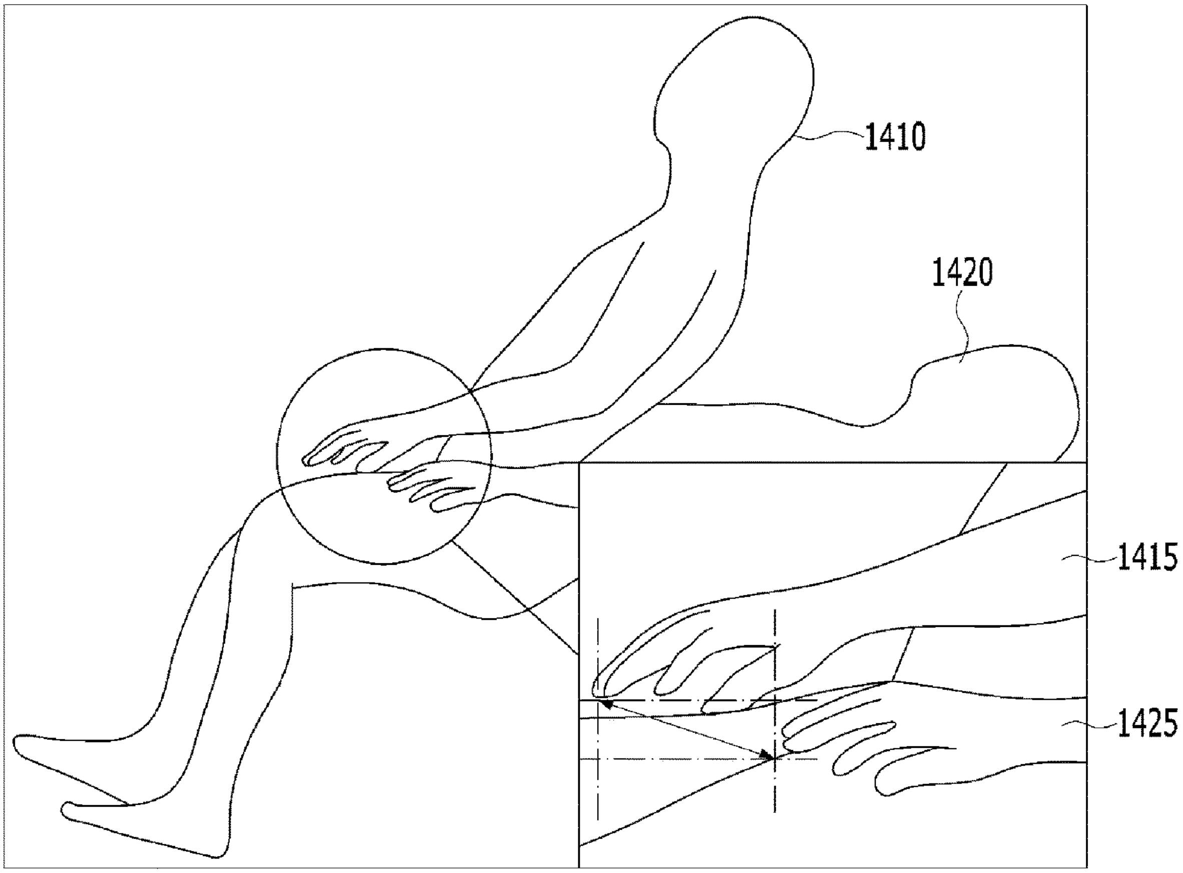
FIG. 14 is a view illustrating a posture of a user according to a posture of a massage apparatus according to an embodiment of the present invention.

FIG. 14 is a view for depicting a posture of the user according to a posture of a massage apparatus according to an embodiment of the present invention.

In a case in which the back frame 2232 is erected forward, the user's posture may be the same as a first posture 1410. In addition, in a case in which the back frame 2232 is tilted backward, the user's posture may be the same as a second posture 1420. In a case in which the user is taking the first posture 1410, which is a sitting posture, the position of the arm of the user may be the same as the first position 1415. In addition, in a case in which the user is taking the second posture 1410, which is a lying posture, the position of the arm of the user may be the same as the second position 1415. That is, in a case in which the posture of the user is changed into the second posture 1420 from the first posture 1410, the arm of the user may move downward while moving backward. The massage apparatus 100 according to the present invention may downwardly lower the upper cover 710 including the arm massage unit as the back frame 2232 is tilted backward. Accordingly, the massage apparatus 100 may effectively provide massage to the arm even if the user is lying down.

Figure 15:
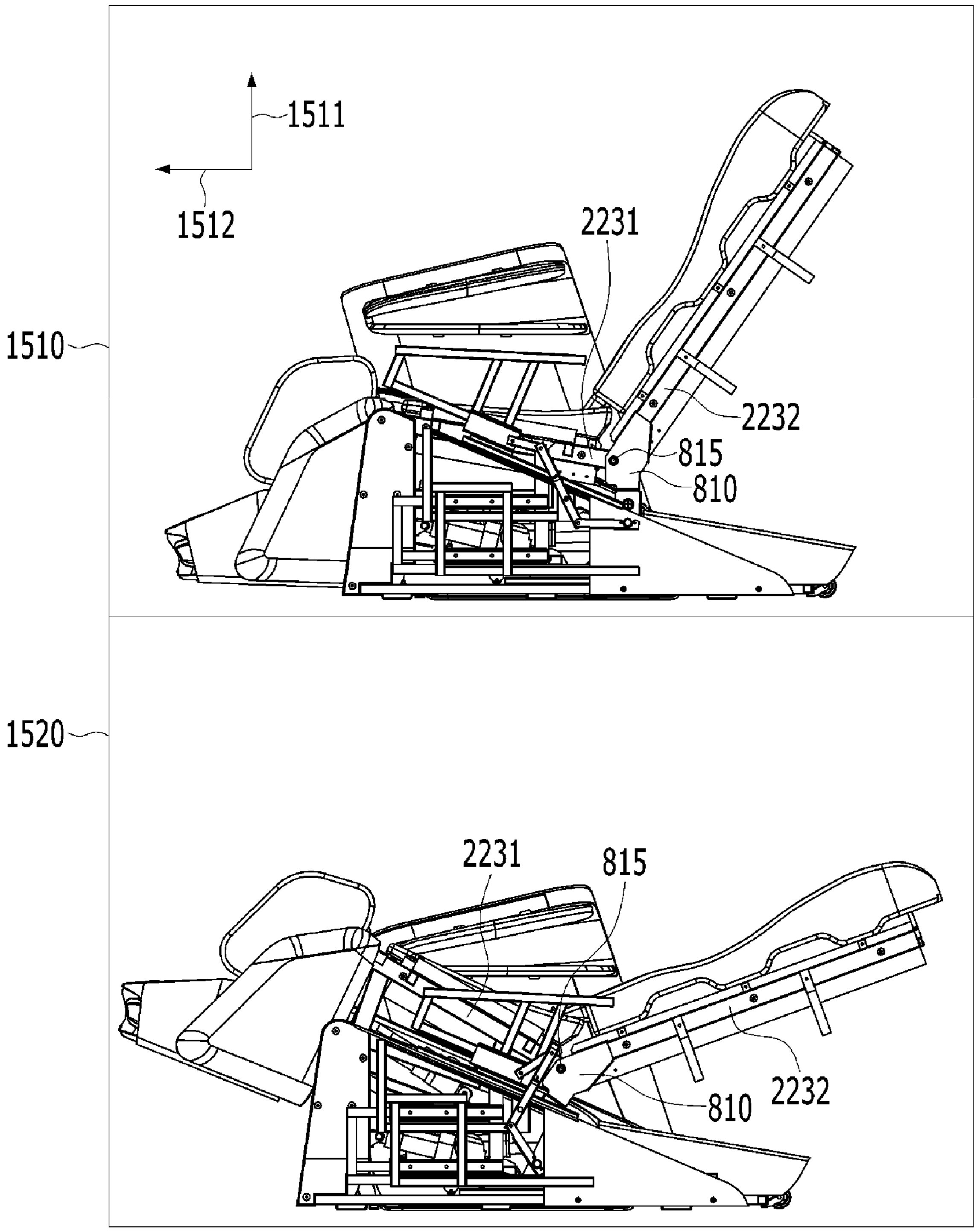
FIG. 15 is a view illustrating an operation of a massage apparatus according to an embodiment of the present invention.

FIG. 15 is a view for depicting an operation of a massage apparatus according to an embodiment of the present invention.

The drawing 1510 of FIG. 15 may illustrate a state in which the back frame 2232 is erected. The drawing 1510 of FIG. 15 corresponds to the drawing 1310 of FIG. 13. FIG. 15 may be a view illustrating a state in which a portion of a housing of the massage apparatus 100 is removed. The drawing 1520 of FIG. 15 may illustrate a state in which the front 1512 of the buttock frame 2231 is lifted upward 1511 and the back frame 2232 is tilted backward.

As described above, the movement of the buttock frame 2231 may be controlled independently of the movement of the back frame 2232. That is, an actuator for moving the buttock frame 2231 may be provided separately from an actuator for moving the back frame 2232. The controller 300 of the massage apparatus 100 may control the front 1512 of the buttock frame 2231 to be lifted upward 1511. Also, that the front 1512 of the buttock frame 2231 is lifted upward 1511 may mean that the buttock frame 2231 rotates round the frame rotation shaft 815. As described above, the frame rotation shaft 815 of the frame connection part 810 may pass through the back of the buttock frame 2231 from side to side.Although not illustrated in the drawing 1520 of FIG. 15, the front of the buttock frame 2231 may move upward or downward based on the frame rotation shaft 815 in a state in which the frame connection part 810 and the back frame 2232 do not move. Furthermore, that the front of the buttock frame 2231 may move upward may mean that the buttock frame 2231 rotates clockwise around the frame rotation shaft 815. Here, the clockwise direction is described with reference to FIG. 15.

The drawing 1520 of FIG. 15 illustrates a state in which the buttock frame 2231 and the back frame 2232 move. The massage apparatus 100 may control the movement of the buttock frame 2231 and the movement of the back frame 2232 by an actuator. Since the movement of the back frame 2232 and the movement of the buttock frame 2231 depending on movement of the back frame 2232 and movement of the buttock frame 2231 have been described above, repeated descriptions thereof will be omitted. Hereinafter, another operation of the massage apparatus will be described with reference to FIG. 16.

Figure 16:
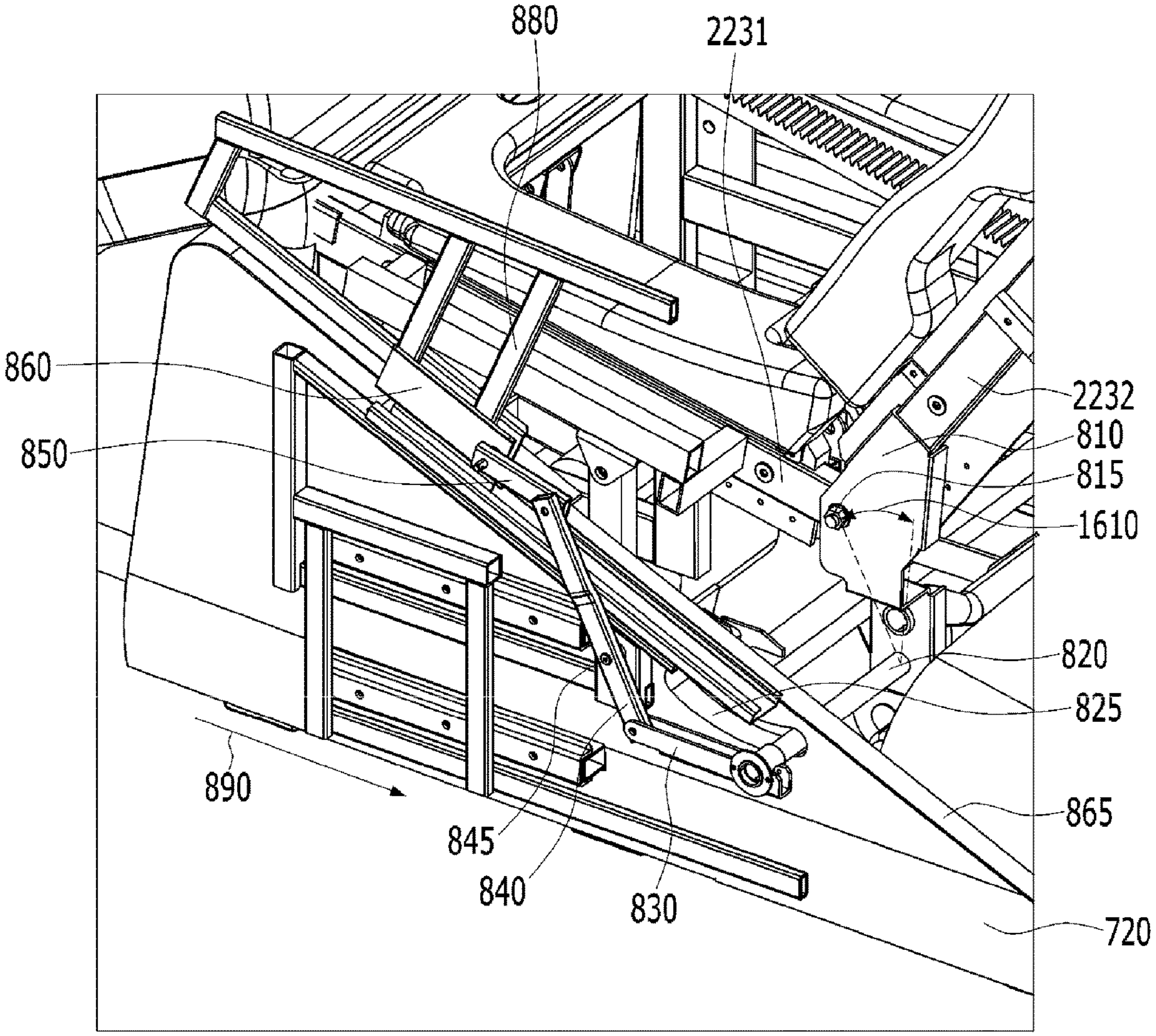
FIG. 16 is a view illustrating an operation of a massage apparatus according to an embodiment of the present invention.

FIG. 16 is a view for depicting an operation of a massage apparatus according to an embodiment of the present invention.

The frame rotation shaft 815 of the frame connection part 810 may be rotatable 1610 around the driving shaft 820. Since the buttock frame 2231 is connected to the back frame 2232 by the frame connection part 810, in a case in which the frame rotation shaft 815 of the frame connection part 810 rotates around the driving shaft 820, the buttock frame 2231 and the back frame 2232 may move simultaneously.

FIG. 16 illustrates an initial state of the driving shaft slot 825 into which the driving shaft 820 is inserted. However, the frame rotation shaft 815 can rotate 1610 around the driving shaft 820 which location of the driving shaft slot 825 the driving shaft 820 is positioned. As described above, the buttock frame 2231 and the back frame 2232 of the massage apparatus 100 may move with a high degree of freedom. Accordingly, the massage apparatus according to the present invention can provide various postures to the user, and increase user satisfaction with respect to massage.

Various embodiments according to the present invention have been described. It will be understood by those skilled in the art that the present invention may be implemented in a modified form without departing from the essential characteristics of the present invention. Therefore, the disclosed embodiments should be considered in the expository perspective rather than limitative perspective. Therefore, the scope of the present invention is defined not by the detailed description of the invention but by the appended claims, and all differences within the equivalent scope will be construed as being included in the present invention.

Meanwhile, embodiments of the present invention described above may be made as a computer-executable program, and may be implemented in a general-purpose digital computer that operates the program using a computer-readable recording medium. The computer-readable recording medium includes a storage medium, such as a magnetic storage medium (e.g., a ROM, a floppy disk, a hard disk, etc.), or an optical recording medium (e.g., a CD-ROM, a DVD, etc.).

The invention claimed is:

1. A massage apparatus comprising:

a frame connection part for connecting a buttock frame included in a main frame and a back frame included in the main frame and rotating around a frame rotation shaft depending on movement of the back frame;

a driving shaft passing through the frame connection part and moving along an arc-shaped driving shaft slot depending on the movement of the back frame;

a third link for transmitting the movement of the driving shaft;

a second link rotating around a link rotation shaft depending on the movement of the third link;

a first link transmitting the movement of the second link to an arm massage unit frame holder; and the arm massage unit frame holder moving along a sliding rail depending on the movement of the first link, wherein the driving shaft is connected to one end of the third link, the other end of the third link is connected to one end of the second link, and the other end of the first link is connected to the arm massage unit frame holder.

2. The massage apparatus according to claim 1, wherein the first link, the second link, the third link, the arm massage unit frame holder, the driving shaft slot, the arm massage unit coupling groove, and the sliding rail are included in a side cover, and wherein the side cover is separable from the massage apparatus.

3. The massage apparatus according to claim 2, wherein the main frame is separable from the side cover, and wherein a main frame protrusion included in the main frame is inserted into the arm massage unit coupling groove included in the side cover, and the driving shaft is inserted into the driving shaft slot included in the side cover, and the side cover is coupled to the massage apparatus.

4. The massage apparatus according to claim 1, further comprising:

a driving shaft plunger connecting the driving shaft and the third link, wherein the driving shaft is inserted into a groove of the driving shaft plunger, and wherein the driving shaft plunger is coupled to the third link.

5. The massage apparatus of claim 1, wherein a length ranging from the link rotation shaft to one end of the second link is shorter than a length ranging from the link rotation shaft to the other end of the second link.

6. The massage apparatus of claim 1, wherein when the back frame is tilted backward, the frame connection part rotates around the frame rotation shaft, wherein the driving shaft passing through the other end of the frame connection part moves forward along the driving shaft slot, wherein the third link connected to the driving shaft moves one end of the second link forward so that the second link rotates around the link rotation shaft, wherein the other end of the second link moves backward by the rotation of the second link, and wherein the first link connected to the other end of the second link moves backward along the sliding rail together with the arm massage unit frame holder.

7. The massage apparatus of claim 2, wherein the side cover includes a lower cover and an upper cover, and the lower cover has an inclined surface descending backward and is fixed to the main frame not to move, and wherein the sliding rail is disposed along an inclined surface of the lower cover.

8. The massage apparatus of claim 7, wherein the upper cover includes an arm massage unit frame, and the arm massage unit frame coupled to the arm massage unit frame holder descends backward based on the sliding rail on the inclined surface.

9. The massage apparatus of claim 1, wherein the frame rotation shaft of the frame connection part passes through the buttocks frame from side to side, and wherein the frame connection part rotates around the frame rotary shaft so that the buttock frame does not move when the back frame is tilted backward or is erected forward.

10. The massage apparatus of claim 1, wherein the frame rotation shaft of the frame connection part penetrates a back of the buttock frame from side to side, and wherein a front of the buttock frame moves upward or downward based on the frame rotation shaft in a state in which the frame connection part and the back frame do not move.

11. The massage apparatus of claim 1, wherein the driving shaft slot is in an arc shape of which the ground direction is convex.

12. The massage apparatus of claim 1, wherein the driving shaft is rotatable along the arc-shaped driving shaft slot around the frame rotation shaft of the frame connection part.

* * * * *